(12) United States Patent
Yang et al.

(10) Patent No.: US 11,521,621 B2
(45) Date of Patent: Dec. 6, 2022

(54) GATHERING USER'S SPEECH SAMPLES

(71) Applicant: LG ELECTRONICS INC., Seoul (KR)

(72) Inventors: Siyoung Yang, Seoul (KR); Yongchul Park, Seoul (KR); Sungmin Han, Seoul (KR); Sangki Kim, Seoul (KR); Juyeong Jang, Seoul (KR); Minook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 143 days.

(21) Appl. No.: 17/028,527

(22) Filed: Sep. 22, 2020

(65) Prior Publication Data
US 2021/0134301 A1  May 6, 2021

(30) Foreign Application Priority Data

Nov. 6, 2019  (KR) .................. 10-2019-0140902

(51) Int. Cl.
*G10L 17/04* (2013.01)
*G10L 15/07* (2013.01)
*G10L 15/06* (2013.01)

(52) U.S. Cl.
CPC ............ *G10L 17/04* (2013.01); *G10L 15/063* (2013.01); *G10L 15/075* (2013.01); *G10L 2015/0631* (2013.01)

(58) Field of Classification Search
CPC ......... G10L 13/00; G10L 15/00; G10L 17/00; G10L 2015/00
See application file for complete search history.

(56) References Cited

U.S. PATENT DOCUMENTS

| | | | | |
|---|---|---|---|---|
| 8,782,171 | B2* | 7/2014 | Karray ............... | H04M 3/4938 |
| | | | | 379/88.16 |
| 9,093,069 | B2* | 7/2015 | Lee ....................... | G06F 21/78 |
| 9,741,337 | B1* | 8/2017 | Shastry ................. | G10L 17/04 |
| 10,170,121 | B2* | 1/2019 | Lüddecke et al. ...... | G10L 15/30 |
| 10,388,272 | B1* | 8/2019 | Thomson .............. | G06F 40/44 |
| 10,540,980 | B2* | 1/2020 | Zheng ................. | H04L 63/0861 |
| 10,917,519 | B2* | 2/2021 | Engelke ............ | H04M 3/42391 |
| 11,222,624 | B2* | 1/2022 | Kim ....................... | G10L 17/18 |
| 2007/0055529 | A1* | 3/2007 | Kanevsky ........... | G10L 15/1822 |
| | | | | 704/275 |

(Continued)

OTHER PUBLICATIONS

Sudoh, Katsuhito, and Mikio Nakano. "Post-dialogue confidence scoring for unsupervised statistical language model training." Speech Communication 45.4 (2005): 387-400. (Year: 2005).*

*Primary Examiner* — Neeraj Sharma
(74) *Attorney, Agent, or Firm* — Birch, Stewart, Kolasch & Birch, LLP

(57) ABSTRACT

Disclosed is gathering a user's speech samples. According to an embodiment of the disclosure, a method of gathering learning samples may gather a speaker's speech data obtained while talking on a mobile terminal and text data generated from the speech data and gather training data for generating a speech synthesis model. According to the disclosure, the method of gathering learning samples may be related to artificial intelligence (AI) modules, unmanned aerial vehicles (UAVs), robots, augmented reality (AR) devices, virtual reality (VR) devices, and 5G service-related devices.

16 Claims, 22 Drawing Sheets

(56) References Cited

U.S. PATENT DOCUMENTS

| | | | |
|---|---|---|---|
| 2009/0259466 A1* | 10/2009 | Stubley | G10L 15/08 704/240 |
| 2013/0225129 A1* | 8/2013 | Norbisrath | H04L 63/105 455/411 |
| 2016/0179831 A1* | 6/2016 | Gruber | G06F 40/42 704/235 |
| 2017/0053652 A1* | 2/2017 | Choi | G10L 15/16 |
| 2017/0098284 A1* | 4/2017 | Schneider | G06Q 10/1095 |
| 2017/0133007 A1* | 5/2017 | Drewes | G10L 15/063 |
| 2017/0256260 A1* | 9/2017 | Jeong | G06F 3/16 |
| 2018/0082702 A1* | 3/2018 | Nickel | G10L 25/06 |
| 2018/0315429 A1* | 11/2018 | Taple | G10L 17/24 |
| 2018/0315438 A1* | 11/2018 | Davies | G10L 25/60 |
| 2020/0265649 A1* | 8/2020 | Chaurasia | G06F 3/011 |
| 2020/0279228 A1* | 9/2020 | Vaananen | G06Q 10/103 |
| 2020/0312337 A1* | 10/2020 | Stafylakis | G10L 17/00 |

* cited by examiner

GATHERING USER'S SPEECH SAMPLES

CROSS-REFERENCE TO RELATED APPLICATION(S)

This application is based on and claims priority under 35 U.S.C. 119 to Korean Patent Application No. 10-2019-0140902, filed on Nov. 6, 2019, in the Korean Intellectual Property Office, the disclosure of which is herein incorporated by reference in its entirety.

BACKGROUND OF INVENTION

Technical Field

The disclosure concerns gathering users' speech samples.

Description of Related Art

An artificial intelligence (AI) system is a computer system that achieve human-level intelligence, which, unlike existing rule-based smart systems, makes machines smart enough to learn and decide on their own. The more the artificial intelligence system is used, the higher its recognition rate and the better it understands a user's preferences. Hence, the existing rule-based smart systems are being gradually replaced by deep learning-based artificial intelligence systems.

Artificial intelligence technologies include machine learning and element technologies using machine learning.

Machine learning is an algorithm technique that it itself may classify and learn the features of input data. The component technology is a technique for mimicking the human brain's perception and decision capabilities using a machine learning algorithm (e.g., deep learning), and this may be divided into several technical fields, such as linguistic understanding, visual understanding, inference/prediction, knowledge expression, and operation control.

Training learning models, such as speech recognition models or speech synthesis models, require a plurality of pieces of learning data. However, upon gathering speech data, temporal/spatial inconvenience ensues.

SUMMARY

The disclosure aims to address the foregoing issues and/or needs.

The disclosure also aims to implement gathering users' speech samples for obtaining learning data while talking on user equipment.

The disclosure also aims to implement gathering users' speech samples for updating learning data as call time or call frequency increases.

The disclosure also aims to implement gathering users' speech samples, which differentiates speech data of a pre-registered user from among a plurality of pieces of voice data obtained while talking on the phone using a speaker verification model and use the speech data for training a learning model.

The disclosure also aims to implement gathering users' speech samples, which determines whether a speaker's speech data and/or text data based on the speaker's voice data is appropriate as learning data and use only appropriate data as learning data.

The disclosure also aims to implement gathering users' speech samples, which may identify learning data via a user equipment before transmitting the learning data to a server for training a learning model.

According to an embodiment of the disclosure, a method of gathering learning samples comprises obtaining a speaker's speech data via a microphone when a call event occurs, performing speaker verification by comparing the speaker's speech data obtained with a registered user's speech data, if the speaker is determined to be the registered user as a result of the speaker verification, storing the speaker's speech data obtained while the call event lasts, and generating the speaker's text data from the speaker's speech data.

The method may further comprise transmitting learning data including the speaker's speech data and text data to a server.

The learning data may be data labeled with identification information about the registered user.

Transmitting the learning data to the server may include transmitting the learning data at a preset update time.

The method may further comprise receiving consent related to gathering the user's speech data and, upon receiving the consent, obtaining the user's speech data for user registration.

The method may further comprise, unless the speaker is determined to be the registered user, deleting the speaker's speech data obtained while the call event lasts.

The method may further comprise splitting the speaker's speech data obtained, based on at least one idle period.

The method may further comprise determining the number of non-registered words in a language dictionary by comparing the speaker's text data with the language dictionary and deleting the speaker's speech data and text data if the number of non-registered words is not less than a preset threshold based on a result of the determination.

The method may further comprise identifying a non-linguistic segment based on the speaker's utterance time and deleting the speaker's speech data and text data corresponding to the identified non-linguistic segment.

The method may further comprise computing a signal-to-noise ratio (SNR) by analyzing the speaker's speech data and deleting the speaker's speech data if the SNR is less than a preset threshold.

According to an embodiment of the disclosure, an intelligent device comprises a memory, a microphone obtaining a speaker's speech data when a call event occurs, and a processor performing speaker verification by comparing the speaker's speech data obtained with a registered user's speech data, if the speaker is determined to be the registered user as a result of the speaker verification, storing, in the memory, the speaker's speech data obtained while the call event lasts, and generating the speaker's text data from the speaker's speech data.

An embodiment of the disclosure may provide the following effects.

The disclosure enables obtaining learning data while talking on a user equipment.

Further, the disclosure may update learning data as call time or frequency increases.

The disclosure may differentiate speech data of a pre-registered user from among a plurality of pieces of voice data obtained while talking on the phone using a speaker verification model and use the speech data for training a learning model.

The disclosure may determine whether a speaker's speech data and/or text data based on the speaker's voice data is appropriate as learning data and use only appropriate data as learning data.

The disclosure may identify learning data via a user equipment before transmitting the learning data to a server for training a learning model.

Effects of the disclosure are not limited to the foregoing, and other unmentioned effects would be apparent to one of ordinary skill in the art from the following description.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION OF THE EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
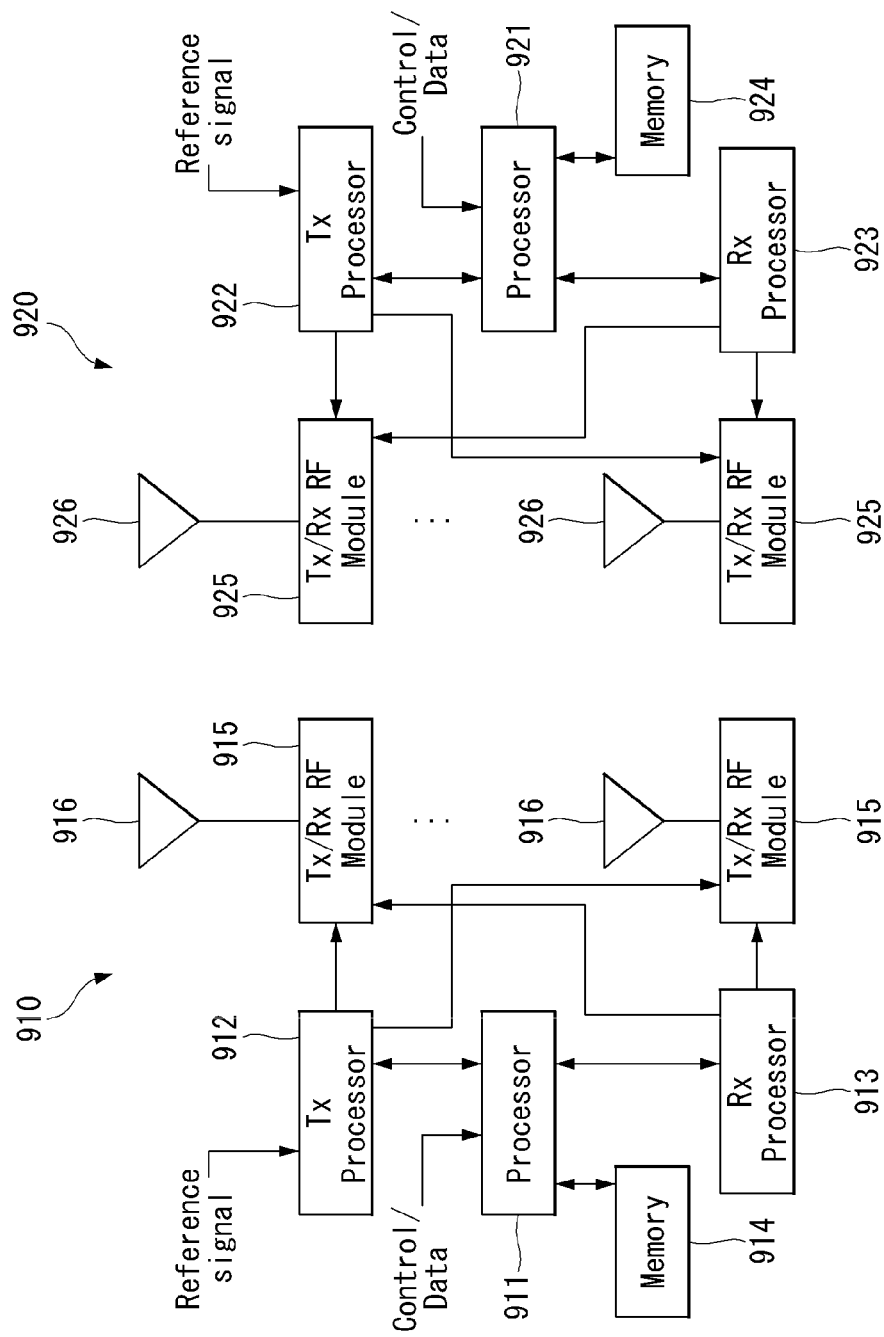
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
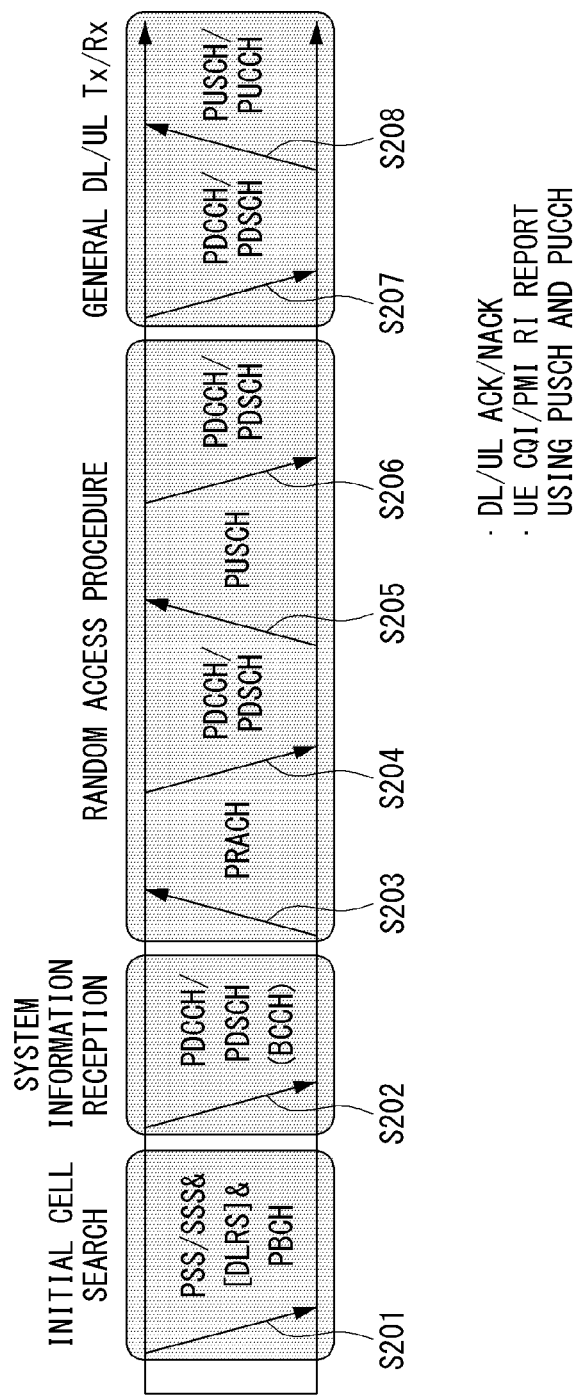
FIG. 2 is a diagram showing an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set.

CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequency Sect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

Figure 3:
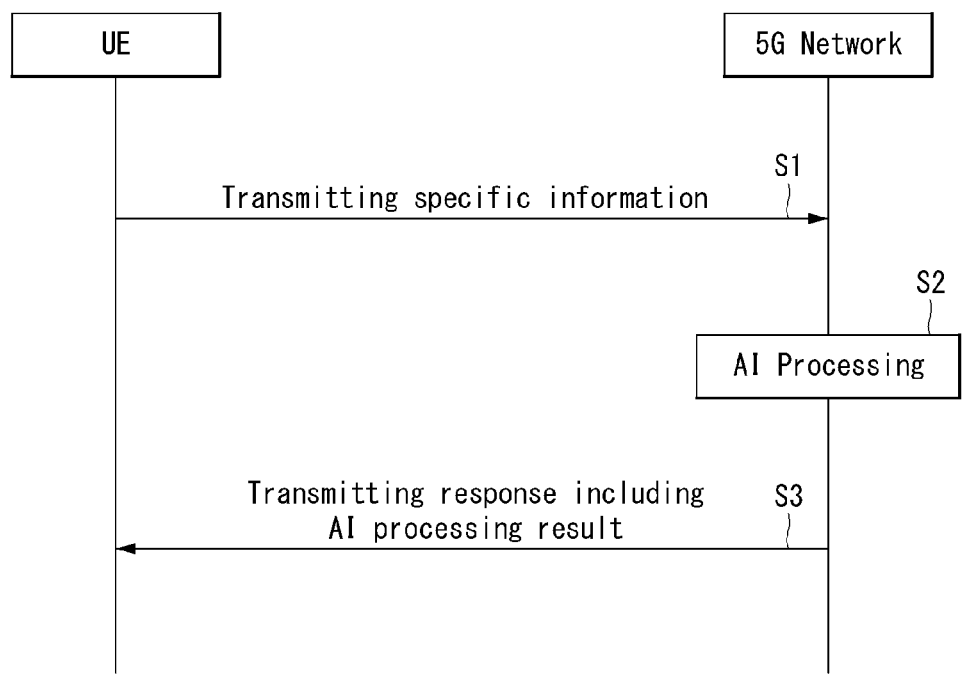
FIG. 3 shows an example of basic operations of an autonomous vehicle and a 5G network in a 5G communication system.

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

Figure 4:
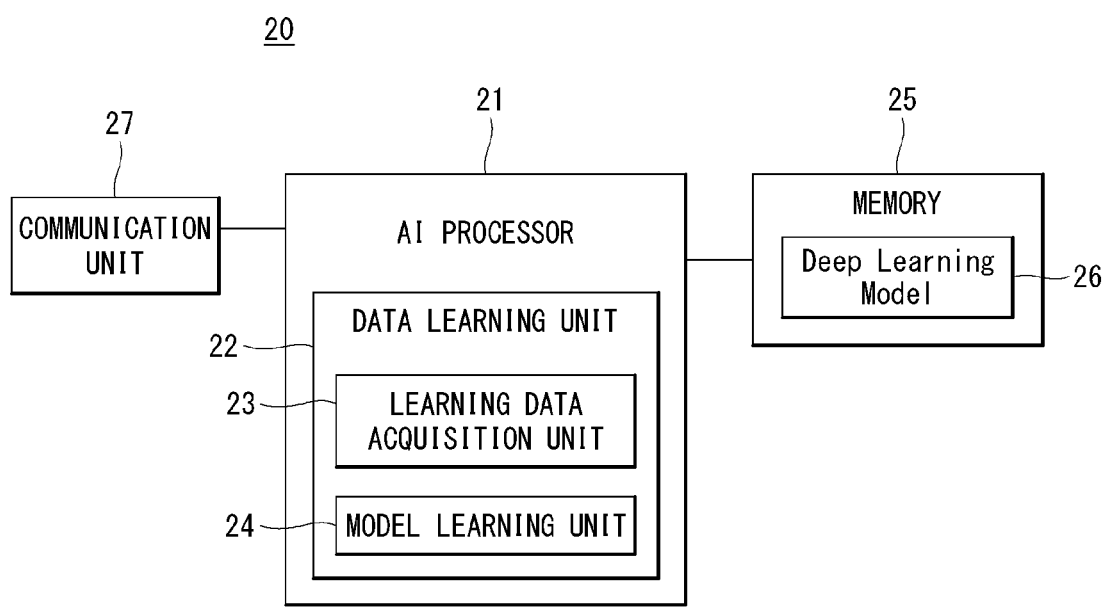
FIG. 4 is a block diagram illustrating an AI device according to an embodiment of the disclosure.

FIG. 4 is a block diagram of an AI device according to an embodiment of the present disclosure.

An AI device 20 may include an electronic device including an AI module that can perform AI processing, a server including the AI module, or the like. Further, the AI device 20 may be included as at least one component of the vehicle 10 shown in FIG. 1 to perform together at least a portion of the AI processing.

The AI processing may include all operations related to driving of the vehicle. For example, an autonomous vehicle can perform operations of processing/determining, and control signal generating by performing AI processing on sensing data or driver data. Further, for example, an autonomous vehicle can perform autonomous driving control by performing AI processing on data acquired through interaction with other electronic devices included in the vehicle.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to vehicles. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 4 was functionally separately described into the AI processor 21, the memory 25, the communication unit 27, etc., but it should be noted that the aforementioned components may be integrated in one module and referred to as an AI module.

Figure 5:
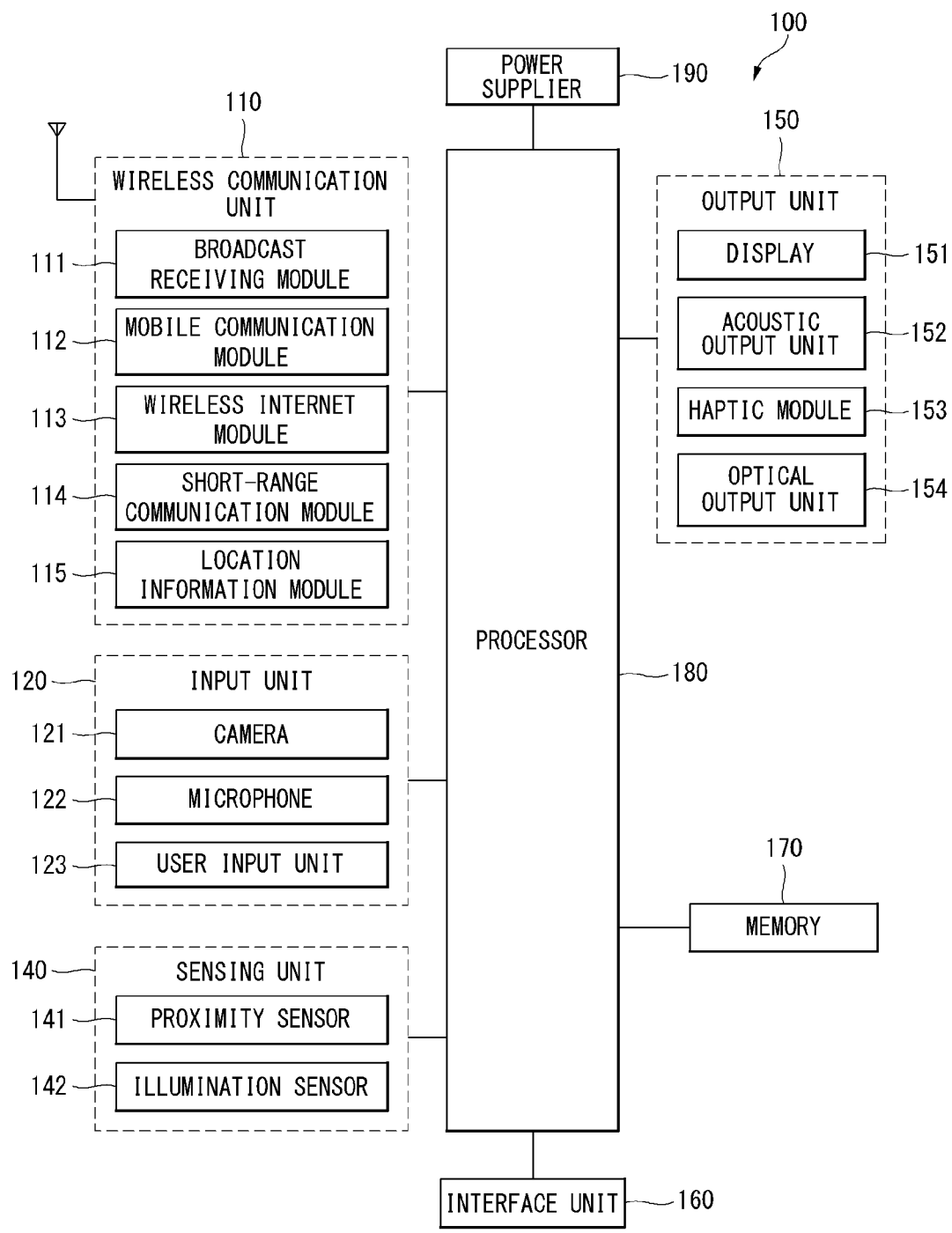
FIG. 5 is a block diagram illustrating a mobile terminal related to the disclosure.

Referring to FIG. 5, a mobile terminal 100 may include a wireless communication unit 110, an input unit 120, a sensing unit 140, an output unit 150, an interface unit 160, a memory 170, a processor 180, and a power supply unit 190, and the like. It is understood that all the components illustrated in FIG. 5 are not requirements to implement the mobile terminal, and that more or fewer components may be alternatively implemented.

More specifically, the wireless communication unit 110 may include one or more modules which permit wireless communications between the mobile terminal 10 and a wireless communication system, between the mobile terminal 10 and another mobile terminal 10, or between the mobile terminal 10 and an external server. Further, the wireless communication unit 110 may include one or more modules which connect the mobile terminal 10 to one or more 5G networks.

The wireless communication unit 110 may include at least one of a broadcast receiving module 111, a mobile communication module 112, a wireless Internet module 113, a short-range communication module 114, or a location information module 115.

The input unit 120 may include a camera 121 which is one type of an image input unit for inputting an image signal, a microphone 122 which is one type of an audio input unit for inputting an audio signal, and a user input unit 123 (e.g., touch key, push key, etc.) for allowing a user to input information. Audio data or image data obtained by the input unit 120 may be analyzed and processed by user control commands.

The sensing unit 140 may include one or more sensors for sensing at least one of internal information of the mobile terminal, information about a surrounding environment of the mobile terminal, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g., camera 121), the microphone 122, a battery gauge, an environment sensor (e.g., a barometer, a hygrometer, a thermometer, a radiation detection sensor, a thermal sensor, a gas sensor, etc.), and a chemical sensor (e.g., an electronic nose, a health care sensor, a biometric sensor, etc.). The mobile terminal disclosed in the present specification may be configured to combine and utilize information obtained from two or more sensors of the sensing unit 140.

The output unit 150 may be configured to output various types of information, such as audio, video, tactile output, and the like. The output unit 150 may include at least one of a display unit 151, an audio output unit 152, a haptic module 153, or an optical output unit 154. The display unit 151 may have an inter-layered structure or an integrated structure with a touch sensor to implement a touch screen. The touch screen may provide an output interface between the mobile terminal 10 and the user, as well as function as the user input unit 123 which provides an input interface between the mobile terminal 10 and the user.

The interface unit 160 serves as an interface with various types of external devices that can be coupled to the mobile terminal 10. The interface unit 160 may include at least one of wired/wireless headset ports, external power supply ports, wired/wireless data ports, memory card ports, ports for connecting a device having an identification module, audio input/output (I/O) ports, video I/O ports, or earphone ports. The mobile terminal 10 may perform assorted control functions associated with a connected external device, in response to the external device being connected to the interface unit 160.

The memory 170 stores data to support various functions of the mobile terminal 10. For instance, the memory 170 may be configured to store multiple application programs or applications executed in the mobile terminal 10, data or instructions for operations of the mobile terminal 10, and the like. At least some of these application programs may be downloaded from an external server via wireless communication. Other application programs may be installed within the mobile terminal 10 at time of manufacturing or shipping, which is typically the case for basic functions (e.g., receiving a call, placing a call, receiving a message, sending a message, and the like) of the mobile terminal 10. The application programs may be stored in the memory 170, installed in the mobile terminal 10, and executed by the processor 180 to perform an operation (or function) for the mobile terminal 10.

The processor 180 typically functions to control overall operation of the mobile terminal 10, in addition to the operations associated with the application programs. The processor 180 may provide or process suitable information or functions appropriate for the user by processing signals, data, information and the like, which are input or output by the components mentioned above, or activating application programs stored in the memory 170.

The processor 180 may control at least some of the components illustrated in FIG. 5 in order to execute an application program that have been stored in the memory 170. In addition, the processor 180 may combine and operate at least two of the components included in the mobile terminal 100 for the execution of the application program.

The power supply unit 190 is configured to receive external power or provide internal power and supply power to the respective components included in the mobile terminal 100 under the control of the processor 180. The power supply unit 190 may include a battery, and the battery may be configured to be embedded in the device body, or configured to be detachable from the device body.

At least some of the above components may be combined with one another and operate, in order to implement an operation, a control, or a control method of a mobile terminal according to various embodiments described below. Further, the operation, the control, or the control method of the mobile terminal according to various embodiments may be implemented on the mobile terminal by an activation of at least one application program stored in the memory 170.

Figure 6:
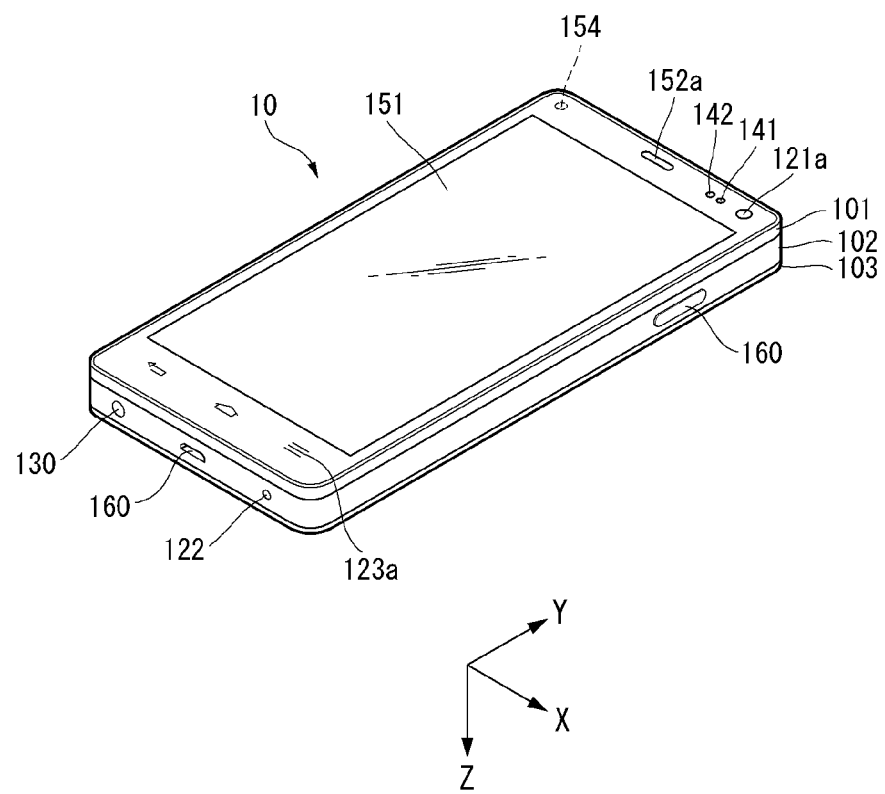
FIGS. 6 and 7 are concept views illustrating example mobile terminals related to the disclosure, as viewed in different directions.
Figure 7:
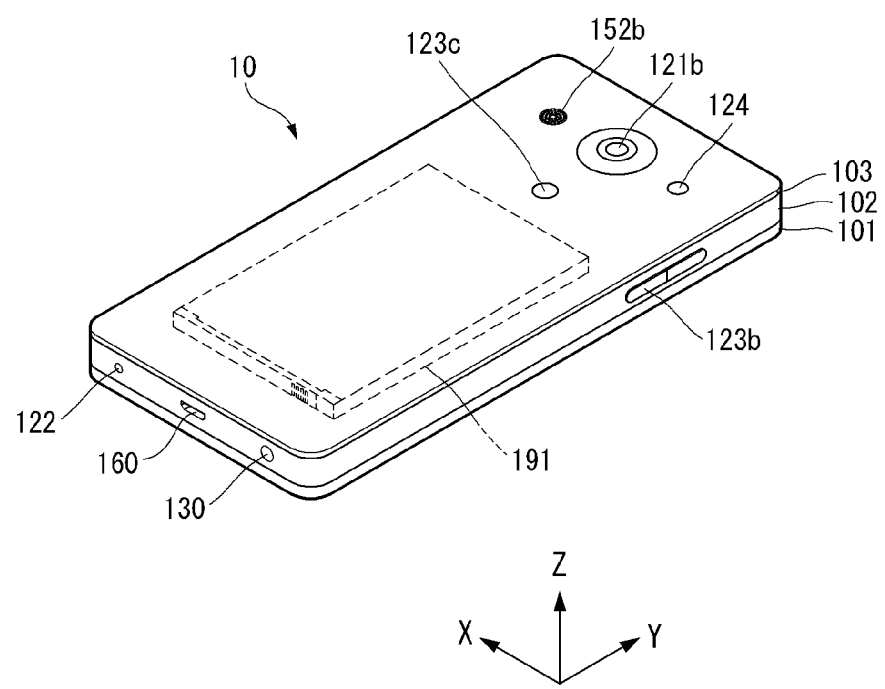

Referring to FIGS. 6 and 7, the mobile terminal 10 includes a bar-shaped terminal body. However, the present disclosure is not limited thereto and may implement the mobile terminal 10 in any of a variety of different configurations. Examples of such configurations include watch-type, clip-type, glasses-type, or folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, the terminal body may be understood as a concept of referring to the mobile terminal 10 by considering the mobile terminal as at least one aggregate.

The mobile terminal 10 includes a case (e.g., frame, housing, cover, etc.) forming an appearance of the terminal. As illustrated, the mobile terminal 10 may include a front case 101 and a rear case 102. Various electronic components are incorporated in an inner space formed by coupling the front case 101 and the rear case 102. At least one middle case may be additionally positioned between the front case 101 and the rear case 102.

The display unit 151 may be located on a front surface of the terminal body to output information. As illustrated, a window 151a of the display unit 151 may be mounted on the front case 101 to form the front surface of the terminal body together with the front case 101.

In some embodiments, electronic components may also be mounted on the rear case 102. Examples of such electronic components mounted on the rear case 102 include a detachable battery, an identification module, a memory card, and the like. In this case, a rear cover 103 covering the electronic components may be detachably coupled to the rear case 102. Therefore, when the rear cover 103 is detached from the rear case 102, the electronic components mounted on the rear case 102 are externally exposed.

As illustrated, when the rear cover 103 is coupled to the rear case 102, a portion of a side surface of the rear case 102 may be exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, and 103 may be formed by injection-molding a synthetic resin or may be formed of a metal, for example, stainless steel (STS), aluminum (Al), titanium (Ti), or the like.

As an alternative to the example in which the plurality of cases form an inner space for accommodating the various electronic components, the mobile terminal 10 may be configured such that one case forms the inner space. In this example, a mobile terminal 10 having a uni-body is formed in such a manner that synthetic resin or metal extends from a side surface to a rear surface.

The mobile terminal 10 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103 to hermetically seal an inner space when those cases are coupled.

The mobile terminal 10 may include the display unit 151, first and second audio output units 152a and 152b, the proximity sensor 141, the illumination sensor 142, the optical output module 154, first and second cameras 121a and 121b, first to third manipulation units 123a, 123b, and 123c, the microphone 122, the interface unit 160, an earphone jack 130, and the like.

Hereinafter, as illustrated in FIGS. 6 and 7, as an example, the mobile terminal 10 is shown configured such that the display unit 151, the first audio output unit 152a, the proximity sensor 141, the illumination sensor 142, the optical output module 154, the first camera 121a, and the first manipulation unit 123a are disposed on the front surface of the terminal body, the second manipulation unit 123b, the microphone 122, the earphone jack 130, and the interface unit 160 are disposed on the side surface of the terminal body, and the second audio output unit 152b, the third manipulation unit 123c, and the second camera 121b are disposed on the rear surface of the terminal body.

However, these components are not limited to these arrangements. In some embodiments, some components may be excluded or replaced, or may be disposed on other surface. For example, the first manipulation unit 123a may not be disposed on the front surface of the terminal body, and the second audio output unit 152b may be disposed on the side surface of the terminal body not the rear surface of the terminal body.

The display unit 151 displays (outputs) information processed in the mobile terminal 10. For example, the display unit 151 may display execution screen information of an application program running in the mobile terminal 10, or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED) display, a flexible display, a three-dimensional (3D) display, or an e-ink display.

The display unit 151 may be implemented using two or more display units according to the implementation type of the mobile terminal 10. In this instance, a plurality of the display units may be disposed on one surface of the mobile terminal 10 to be either spaced apart from each other or integrated, or the display units may be respectively disposed on different surfaces of the mobile terminal 10.

The display unit 151 may also include a touch sensor which senses a touch input received at the display unit 151 in order to receive a control command using a touching manner. If a touch is input to the display unit 151, the touch sensor may be configured to sense the touch, and the processor 180 may be configured to generate a control command corresponding to the touch. The content which is input in the touching manner may be a text or numerical value, or a menu item which can be indicated or designated in various modes.

The touch sensor may be formed in a film type having a touch pattern and disposed between the window 151a and a display (not shown) on a rear surface of the window 151a, or may be a metal wire which is patterned directly on the rear surface of the window 151a. Alternatively, the touch sensor may be integrally formed with the display. For example, the touch sensor may be disposed on a substrate of the display or within the display.

As described above, the display unit 151 may also form a touch screen together with the touch sensor. In this case, the touch screen may serve as the user input unit 123 (see FIG. 5). In some cases, the touch screen may replace at least a part of function of the first manipulation unit 123a.

The first audio output module 152a may be implemented as a receiver which transmits a call sound to user's ears, and the second audio output module 152b may be implemented in the form of a loud speaker to output various alarm sounds or multimedia reproduction sounds.

The window 151a of the display unit 151 may include an audio hole which permits audio generated by the first audio output module 152a to pass. However, the present disclosure is not limited thereto, and one alternative is to allow audio to be released along an assembly gap between structural bodies (for example, a gap between the window 151a and the front case 101). In this case, a hole independently formed to output audio sounds may be invisible or is otherwise hidden in terms of appearance, thereby further simplifying the appearance and manufacturing of the mobile terminal 10.

The optical output unit 154 is configured to output light for indicating that an event has occurred. Examples of the events include a message reception, a call signal reception, a missed call, an alarm, a schedule notice, an email reception, information reception through an application, and the like. When a user has checked a generated event, the processor 180 may control the optical output unit 154 to stop the light output.

The first camera 121a processes image frames of as a still image or a moving image obtained by an image sensor in a capture mode or a video call mode. The processed image frames may then be displayed on the display unit 151 or stored in the memory 170.

The first to third manipulation units 123a, 123b and 123b are examples of the user input unit 123, which is manipulated by a user to provide an input to the mobile terminal 10, and may also be referred commonly to as a manipulating portion. The first to third manipulation units 123a, 123b and 123b may employ any tactile method that allows the user to perform manipulation, such as touch, push, scroll, or the like. The first and second manipulation units 123a and 123b may also employ any non-tactile method that allows the user to perform manipulation such as proximity touch, hovering touch, or the like. The third manipulation unit 123c includes a finger scan sensor and can obtain user's fingerprint. The obtained fingerprint may be provided to the processor 180.

This figure illustrates the first manipulation unit 123a as a touch key, but the present disclosure is not limited thereto. For example, possible alternatives of the first manipulation unit 123a include a mechanical key, a push key, a touch key, and combinations thereof.

Input received at the first and second manipulation units 123a and 123b may be set in various ways. For example, the first manipulation unit 123a may be used by the user to provide an input to a menu, home key, cancel, search, or the like, and the second manipulation unit 123b may be used by the user to provide an input to control a volume level being output from the first or second audio output unit 152a or 152b, to switch to a touch recognition mode of the display unit 151, or the like.

As another example of the user input unit 123, the third manipulation unit 123c may be located on the rear surface of the terminal body. The third manipulation unit 123c may be manipulated by a user to provide input to the mobile terminal 10. The input may be set in a variety ways.

For example, the third manipulation unit 123c may be used by the user to provide an input for power on/off, start, end, scroll, control volume level being output from the first and second audio output units 152a and 152b, switch to a touch recognition mode of the display unit 151, fingerprint information acquisition, and the like. The rear input unit may be configured to permit a touch input, a push input, or combinations thereof.

The rear input unit may be located to overlap the display unit 151 of the front side in a thickness direction of the terminal body. As an example, the rear input unit may be located on an upper end portion of the rear side of the terminal body such that the user can easily manipulate it using a forefinger when the user grabs the terminal body with one hand. However, the present disclosure is not limited thereto. Alternatively, a position of the rear input unit may be changed.

If the rear input unit is positioned on the rear surface of the terminal body as described above, a new type of user interface using the rear input unit can be implemented. If the first manipulation unit 123a is omitted from the front surface of the terminal body by replacing at least some functions of the first manipulation unit 123a on the front surface of the terminal body by the touch screen or the rear input unit described above, the display unit 151 can have a larger screen.

As a further alternative, the mobile terminal 10 may include a finger scan sensor which scans a user's fingerprint. The processor 180 can use fingerprint information sensed by the finger scan sensor as an authentication procedure. The finger scan sensor may also be embedded in the display unit 151 or the user input unit 123.

The microphone 122 is configured to receive user's voice, other sounds, and the like. The microphone 122 may be implemented using a plurality of microphones and configured to receive stereo sounds.

The interface unit 160 serves as a path allowing the mobile terminal 10 to interface with external devices. For example, the interface unit 160 may include at least one of a connection terminal for connecting to another device (e.g., an earphone, an external speaker, etc.), a port for short-range communication (e.g., an infrared data association (IrDA) port, a Bluetooth port, a wireless LAN port, etc.), or a power supply terminal for supplying power to the mobile terminal 10. The interface unit 160 may be implemented in the form of a socket for accommodating an external card, such as subscriber identification module (SIM), user identity module (UIM), or a memory card for information storage.

The second camera 121b may be located at the rear surface of the terminal body. In this instance, the second camera 121b has an image capturing direction that is substantially opposite to an image capturing direction of the first camera unit 121a.

The second camera 121b may include a plurality of lenses arranged along at least one line. The plurality of lenses may also be arranged in a matrix form. The cameras may be referred to as an "array camera." When the second camera 121b is implemented as an array camera, the second camera 121b can take images using the plurality of lenses in various manners and thus can obtain the images with better quality.

A flash 124 may be positioned adjacent to the second camera 121b. When a subject is taken with the second camera 121b, the flash 124 illuminates the subject.

The second audio output module 152b may be additionally located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be embedded in the terminal body or formed at the case. For example, the antenna which forms a part of the broadcast receiving module 111 (see FIG. 5) may be configured to be retractable into the terminal body. Alternatively, the antenna may be formed in a film type and attached to an inner surface of the rear cover 103, or may be replaced by a case including a conductive material.

The power supply unit 190 (see FIG. 5) for supplying power to the mobile terminal 10 is located at the terminal body. The power supply unit 190 may include a battery 191 that is embedded in the terminal body and is detachably configured to the outside of the terminal body.

The battery 191 may be configured to receive power via a power cable connected to the interface unit 160. The battery 191 may also be configured to be charged using a wireless charger. The wireless charging may be implemented by a magnetic induction method or a resonance method (electromagnetic resonance method).

This figure illustrates that the rear cover 103 is configured to couple to the rear case 102 for covering the battery 191 to thereby prevent the separation of the battery 191 and to protect the battery 191 from an external impact or foreign material, by way of example. When the battery 191 is detachable from the terminal body, the rear cover 103 may be detachably coupled to the rear case 102.

An accessory for protecting an appearance or assisting or extending the functions of the mobile terminal 10 may be additionally provided to the mobile terminal 10. Examples of the accessory may include a cover or a pouch for covering or accommodating at least one surface of the mobile terminal 10. The cover or the pouch may be configured to cooperate with the display unit 151 and extend the function of the mobile terminal 10. Another example of the accessory may include a touch pen for assisting or extending a touch input to a touch screen.

Figure 8:
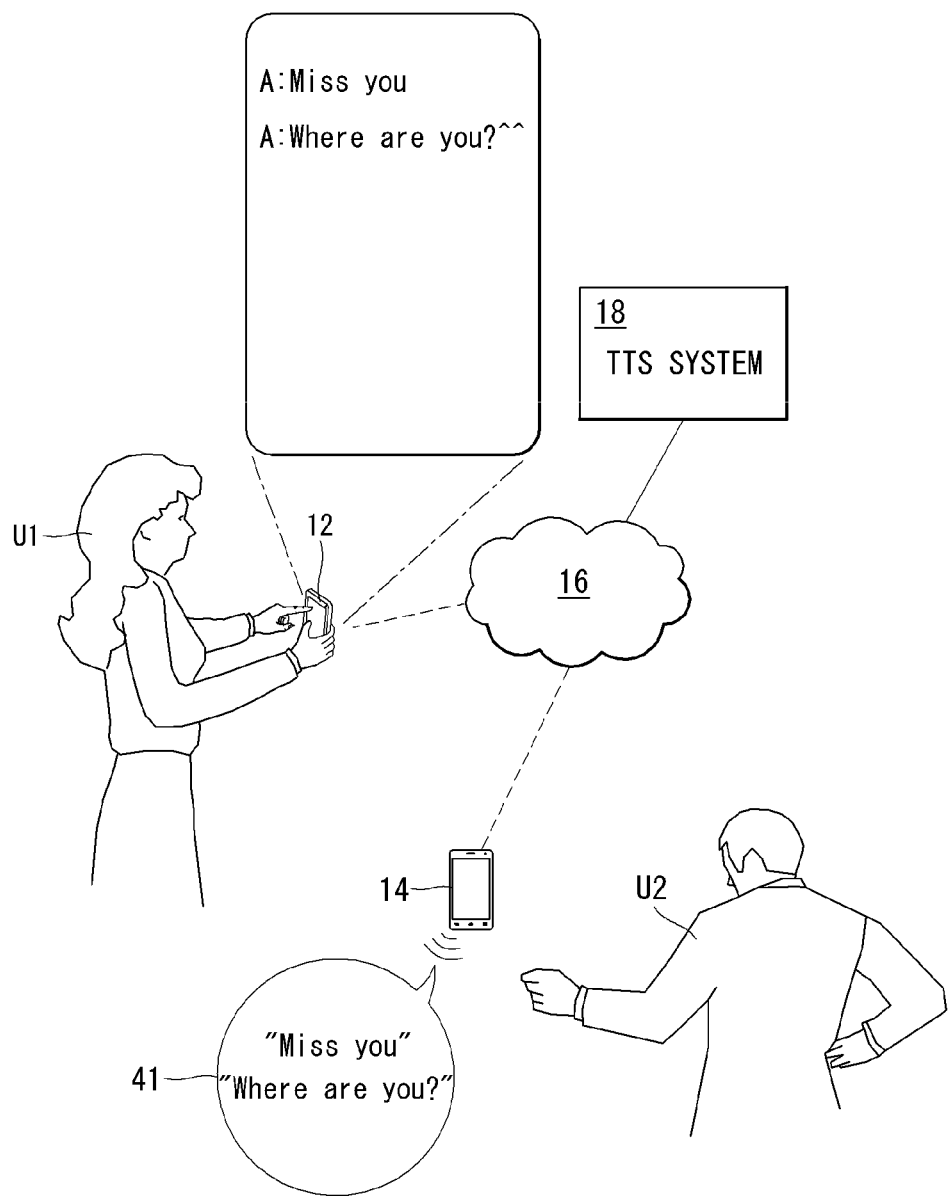
FIG. 8 illustrates communication between two users according to the disclosure.

FIG. 8 shows communication between two users.

Referring to FIG. 8, a first user U1, who can be called a transmitting user, may communicate with a second user U2, who can be called a receiving user, through a transmitting device 12 and a receiving device 14. The first user U1 may disclose a text message (e.g., Miss you. Where are you?:)) to be transmitted to the second user U2 through the receiving device 14 through the transmitting device 12 of the first user U1. In addition, in terms of text messaging, a first user U1 may transmit an instant message through an Instant Messaging (IM) client, and a second user U2 may receive the instant message on the receiving device 14 through the IM client.

The message transmitted by the first user U1 may be transmitted to a TTS system 18. The speech synthesis engine of the TTS system may convert the message into a speech. The second user U2 may hear a speech synthesized in correspondence to the received message and output from the TTS system 180 through the receiving device 14. The transmitting device 12 and the receiving device 14 may include a microphone, a speaker, and a display.

Figure 9:
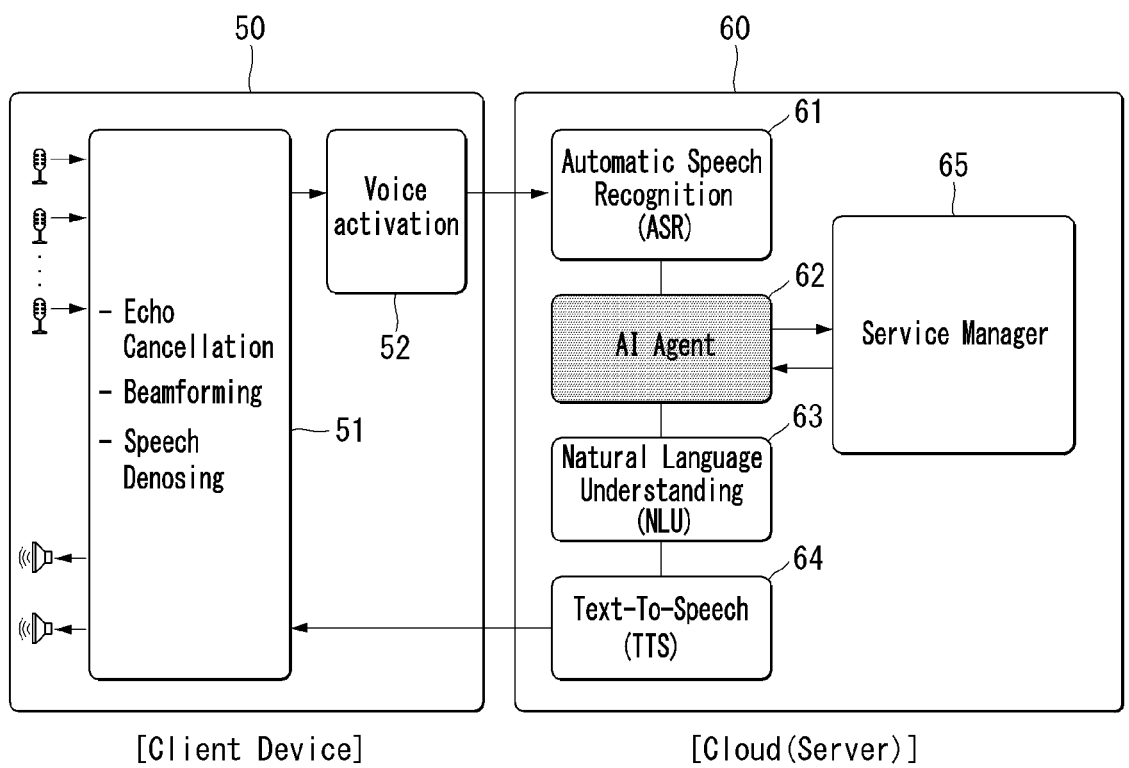
FIG. 9 is a block diagram schematically illustrating a text-to-speech (TTS) in a TTS system according to an embodiment of the disclosure.

Hereinafter, a speech processing procedure performed by a device environment and/or a cloud environment or server environment will be described with reference to FIGS. 9 and 10. FIG. 9 shows an example in which, while a speech can be received in a device 50, a procedure of processing the received speech and thereby synthesize the speech, that is, overall operations of speech synthesis, is performed in a cloud environment 60. On the contrary, FIG. 10 shows an example of on-device processing indicating that a device 70 performs the aforementioned overall operations of speech synthesis by processing a received speech and thereby synthesizing the speech.

Figure 10:
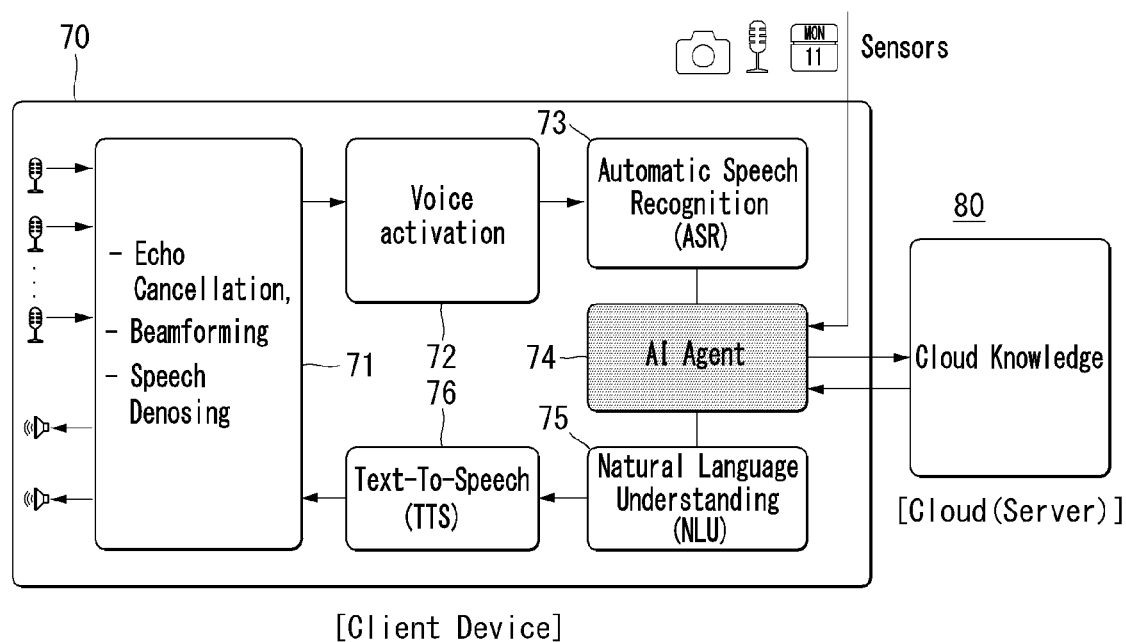
FIG. 10 is a block diagram schematically illustrating a TTS device in a TTS system according to another embodiment of the disclosure.

In FIGS. 9 and 10, the device environments 70 may be referred to as client devices, and the cloud environments 60 and 80 may be referred to as servers.

FIG. 9 shows a schematic block diagram of a text-to-speech (TTS) device in a TTS system according to an embodiment of the present disclosure.

In order to process a speech event in an end-to-end speech UI environment, various configurations are required. A sequence for processing the speech event performs signal acquisition playback, speech pre-processing, voice activation, speech recognition, natural language processing, and speech synthesis by which a device responds to a user.

The client device 50 may include an input module. The input module may receive a user input from a user. For example, the input module may receive the user input from an external device (e.g., a keyboard and a headset) connected thereto. In addition, for example, the input module may include a touch screen. In addition, for example, the input module may include a hardware key located in a user terminal.

According to an embodiment, the input module may include at least one microphone capable of receiving a user's utterance as a speech signal. The input module may include a speech input system and receive a user's speech as a speech signal through the speech input system. By generating an input signal for an audio input, the at least one microphone may determine a digital input signal for a user's speech. According to an embodiment, multiple microphones may be implemented as an array. The array may be arranged in a geometric pattern, for example, a linear geometric shape, a circular geometric shape, or a different random shape. For example, the array may be in a pattern in which four sensors are placed at 90 degrees to receive sound from four directions. In some embodiments, the microphone may include sensors of different arrays in a space of data communication, and may include a networked array of the sensors. The microphone may include an omnidirectional microphone and a directional microphone (e.g., a shotgun microphone).

The client device 50 may include a pre-processing module 51 capable of pre-processing a user input (speech signal) that is received through the input module (e.g., a microphone).

The pre-processing module 51 may include an adaptive echo canceller (AEC) function to thereby remove echo included in a user speech signal received through the microphone. The pre-processing module 51 may include a noise suppression (NS) function to thereby remove background noise included in a user input. The pre-processing module 51 may include an end-point detect (EPD) function to thereby detect an end point of a user speech and thus find out where the user speech exists. In addition, the pre-processing module 51 may include an automatic gain control (AGC) function to thereby control volume of the user speech in such a way suitable for recognizing and processing the user speech.

The client device 50 may include a voice activation module 52. The voice activation module 52 may recognize a wake-up call indicative of recognition of a user's call. The voice activation module 52 may detect a predetermined keyword (e.g., Hi LG) from a user input which has been pre-processed. The voice activation module 52 may remain in a standby state to perform an always-on keyword detection function.

The client device 50 may transmit a user voice input to a cloud server. ASR and natural language understanding (NLU) operations, which are essential to process a user speech, is generally performed in Cloud due to computing, storage, power limitations, and the like. The Cloud may include the cloud device 60 that processes a user input transmitted from a client. The cloud device 60 may exists as a server.

The cloud device 60 may include an auto speech recognition (ASR) module 61, an artificial intelligent agent 62, a natural language understanding (NLU) module 63, a text-to-speech (TTS) module 64, and a service manager 65.

The ASR module 61 may convert a user input, received from the client device 50, into textual data.

The ASR module 61 includes a front-end speech pre-processor. The front-end speech pre-processor extracts a representative feature from a speech input. For example, the front-perform a Fourier transform on the speech input to extract spectral features that characterize the speech input as a sequence of representative multi-dimensional vectors. In addition, The ASR module 61 may include one or more speech recognition modules (e.g., an acoustic model and/or a language module) and may realize one or more speech recognition engines. Examples of the speech recognition model include Hidden Markov Models, Gaussian-Mixture Models, Deep Neural Network Models, n-gram language models, and other statistical models. Examples of the speech recognition model include a dynamic time warping (DTW)-based engine and a weighted finite state transducer (WFST)-based engine. The one or more speech recognition models and the one or more speech recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens).

Once the ASR module 61 generates a recognition result including a text string (e.g., words, or sequence of words, or sequence of tokens), the recognition result is transmitted to the NLP module 732 for intention deduction. In some examples, The ASR module 730 generates multiple candidate text expressions for a speech input. Each candidate text expression is a sequence of works or tokens corresponding to the speech input.

The NLU module 63 may perform a syntactic analysis or a semantic analysis to determine intent of a user. The syntactic analysis may be used to divide a user input into syntactic units (e.g., words, phrases, morphemes, or the like) and determine whether each divided unit has any syntactic element. The semantic analysis may be performed using semantic matching, rule matching, formula matching, or the like. Thus, the NLU module 63 may obtain a domain, intent, or a parameter (or a slot) necessary to express the intent from a user input through the above-mentioned analysis.

According to an embodiment, the NLU module 63 may determine the intent of the user and a parameter using a matching rule which is divided into a domain, intent, and a parameter. For example, one domain (e.g., an alarm) may include a plurality of intents (e.g., alarm setting, alarm release, and the like), and one intent may need a plurality of parameters (e.g., a time, the number of iterations, an alarm sound, and the like). The plurality of rules may include, for example, one or more mandatory parameters. The matching rule may be stored in a natural language understanding database.

According to an embodiment, the NLU module 63 may determine a meaning of a word extracted from a user input using a linguistic feature (e.g., a syntactic element) such as a morpheme or a phrase and may match the determined meaning of the word to the domain and intent to determine the intent of the user. For example, the NLU module 63 may determine the intent of the user by calculating how many words extracted from a user input are included in each of the domain and the intent. According to an embodiment, the NLU module 63 may determine a parameter of the user input using a word which is the basis for determining the intent. According to an embodiment, the NLU module 63 may determine the intent of the user using a NLU DB which stores the linguistic feature for determining the intent of the user input. According to another embodiment, the NLU module 63 may determine the intent of the user using a personal language model (PLM). For example, the NLU module 63 may determine the intent of the user using personalized information (e.g., a contact list, a music list, schedule information, social network information, etc.). For example, the PLM may be stored in, for example, the NLU DB. According to an embodiment, the ASR module 61 as well as the NLU module 63 may recognize a voice of the user with reference to the PLM stored in the NLU DB.

According to an embodiment, the NLU module 63 may further include a natural language generating module (not shown). The natural language generating module may change specified information to a text form. The information changed to the text form may be a natural language speech. For example, the specified information may be information about an additional input, information for guiding the completion of an action corresponding to the user input, or information for guiding the additional input of the user. The information changed to the text form may be displayed in a display after being transmitted to the client device or may be changed to a voice form after being transmitted to the TTS module.

The TTS module 64 may convert text input to voice output. The TTS module 64 may receive text input from the NLU module 63 of the LNU module 63, may change the text input to information in a voice form, and may transmit the information in the voice form to the client device 50. The client device 50 may output the information in the voice form via the speaker.

The speech synthesis module 64 synthesizes speech outputs based on a provided text. For example, a result generated by the ASR module 61 may be in the form of a text string. The speech synthesis module 64 may convert the text string to an audible speech output. The speech synthesis module 64 may use any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis.

In some examples, the speech synthesis module 64 may be configured to synthesize individual words based on phonemic strings corresponding to the words. For example, a phonemic string can be associated with a word in a generated text string. The phonemic string can be stored in metadata associated with the word. The speech synthesis model 64 may be configured to directly process the phonemic string in the metadata to synthesize the word in speech form.

Since the cloud environment generally has more processing capabilities or resources than the client device, a higher quality speech output may be acquired in synthesis on the client side. However, the present disclosure is not limited thereto, and the speech synthesis process may be performed on the client side (see FIG. 10).

Meanwhile, according to an embodiment, the client environment may further include an Artificial Intelligence (AI) agent 62. The AI agent 62 is defined to perform at least some of the above-described functions performed by the ASR module 61, the NLU module 62 and/or the TTS module 64. In addition, the AI module 62 may make contribution so that the ASR module 61, the NLU module 62 and/or the TTS module 64 perform independent functions, respectively.

The AI agent module 62 may perform the above-described functions through deep learning. The deep learning represents a certain data in a form readable by a computer (e.g., when the data is an image, pixel information is represented as column vectors or the like), and efforts are being made to conduct enormous researches for applying the representation to learning (which is about how to create better representation techniques and how to create a model that learns the better representation techniques), and, as a result, various deep learning techniques such as deep neural networks (DNN), convolutional deep neural networks (CNN), Recurrent Boltzmann Machine (RNN), Restricted Boltzmann Machine (RBM), deep belief networks (DBN), and Deep Q-Network, may be applied to computer vision, speech recognition, natural language processing, speech/signal processing, and the like.

Currently, all commercial speech recognition systems (Microsoft's Cortana, Skype translator, Google Now, Apple Siri, etc.) are based on deep learning techniques.

In particular, the AI agent module 62 may perform various natural language processes, including machine translation, emotion analysis, and information retrieval, to process natural language by use of a deep artificial neural network architecture.

Meanwhile, the cloud environment may include a service manager 65 capable of collecting various personalized information and supporting a function of the AI agent 62. The personalized information acquired through the service manager may include at least one data (a calendar application, a messaging service, usage of a music application, etc.) used through the cloud environment, at least one sensing data (a camera, a microphone, temperature, humidity, a gyro sensor, C-V2X, a pulse, ambient light, Iris scan, etc.) collected by the client device 50 and/or the cloud 60, off device data directly not related to the client device 50. For example, the personalized information may include maps, SMS, news, music, stock, weather, Wikipedia information.

For convenience of explanation, the AI agent 62 is represented as an additional block to be distinguishable from the ASR module 61, the NLU module 63, and the TTS module 64, but the AI agent 62 may perform at least some or all of the functions of the respective modules 61, 62, and 64.

In FIG. 9, an example in which the AI agent 62 is implemented in the cloud environment due to computing calculation, storage, power limitations, and the like, but the present disclosure is not limited thereto.

For example, FIG. 10 is identical to what is shown in FIG. 9, except for a case where the AI agent is included in the cloud device.

FIG. 10 is a schematic block diagram of a TTS device in a TTS system environment according to an embodiment of the present disclosure. A client device 70 and a cloud environment 80 shown in FIG. 10 may correspond to the client device 50 and the cloud device 60 aforementioned in FIG. 9, except for some configurations and functions. Accordingly, description about specific functions of corresponding blocks may refer to FIG. 9.

Referring to FIG. 10, the client device 70 may include a pre-processing module 71, a voice activation module 72, an ASR module 73, an AI agent 74, an NLU module 75, and a TTS module 76. In addition, the client device 50 may include an input module (at least one microphone) and at least one output module.

In addition, the cloud environment may include cloud knowledge 80 that stores personalized information in a knowledge form.

A function of each module shown in FIG. 10 may refer to FIG. 9. However, since the ASR module 73, the NLU module 75, and the TTS module 76 are included in the client device 70, communication with Cloud may not be necessary for a speech processing procedure such as speech recognition, speech synthesis, and the like, and thus, an instant real-time speech processing operation is possible.

Each module shown in FIGS. 9 and 10 are merely an example for explaining a speech processing procedure, and modules more or less than in FIGS. 9 and 10 may be included. In addition, two or more modules may be combined or different modules or modules with different arrangement structures may be included. The various modules shown in FIGS. 9 and 10 may be implemented in hardware, software instructions for execution by one or more processors, firmware, including one or more signal processing and/or application specific integrated circuits, or a combination thereof.

Figure 11:
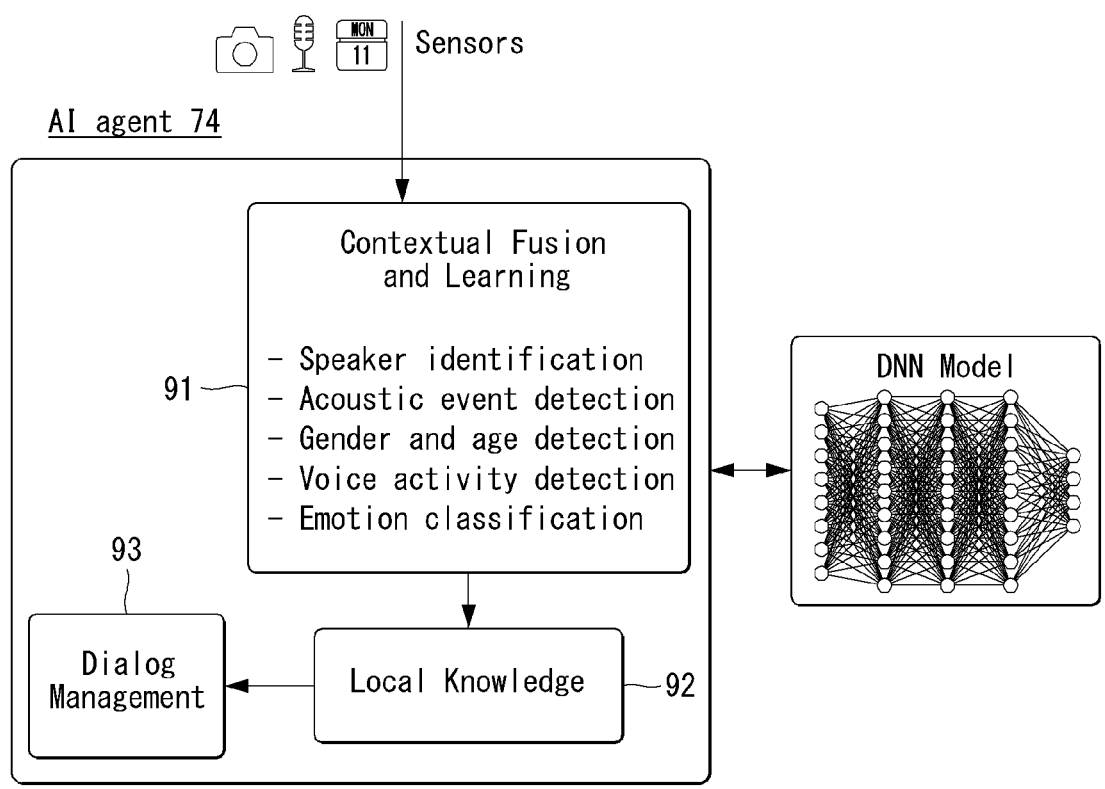
FIG. 11 is a block diagram schematically illustrating an intelligent agent capable of performing TTS according to an embodiment of the disclosure.

FIG. 11 is a schematic block diagram of an AI agent capable of speech synthesis according to an embodiment of the disclosure.

Referring to FIG. 11, in the speech processing procedure described with reference to FIGS. 9 and 10, the AI agent 74 may support an interactive operation with a user, in addition to an ASR operation, an NLU operation, and a TTS operation. Alternatively, using context information, the AI agent 74 may make contribution so that the NLU module 63 further clarify, complements, or additionally define information included in text expressions received from the ASR module 61.

Here, the context information may include preference of a user of a client device, hardware and/or software states of the client device, various types of sensor information received before, during, or after a user input, previous interactions (e.g., dialogue) between the AI agent and the user, etc. In the present disclosure, the context information is dynamic and varies depending on time, location, contents of the dialogue, and other elements.

The AI agent 74 may further include a context fusion and learning module 91, a local knowledge 92, and a dialogue management 93.

The context fusion and learning module 91 may learn a user's intent based on at least one data. The at least one data may further include at least one sensing data acquired by a client device or a cloud environment. In addition, the at least one data may further include speaker identification, acoustic event detection, a speaker's personal information (gender and age detection), voice activity detection (VAD), and emotion classification information.

The speaker identification may indicate specifying a speaker in a speaker group registered by a speech. The speaker identification may include identifying a pre-registered speaker or registering a new speaker. The acoustic event detection may outdo a speech recognition technique and may be used to recognize acoustics itself to recognize a type of sound and a place where the sound occurs. The VAD is a speech processing technique of detecting presence or absence of a human speech (voice) from an audio signal that can include music, noise, or any other sound. According to an embodiment, the AI agent 74 may detect presence of a speech from the input audio signal. According to an embodiment the AI agent 74 differentiates a speech data and a non-speech data using a deep neural networks (DNN) model. In addition, the AI agent 74 may perform emotion classification information on the speech data using the DNN model. According to the emotion classification information, the speech data may be classified as anger, boredom, fear, happiness, or sadness.

The contest fusion and learning module 91 may include a DNN model to perform the above-described operation, and may determine intent of a user input based on sensing information collected in the DNN model, the client device or the cloud environment.

The at least one data is merely an example and may include any data that can be referred to so as to determine intent of a user in a speech processing procedure. The at least one data may be acquired through the above-described DNN model.

The AI agent 74 may include the local knowledge 92. The local knowledge 92 may include user data. The user data may include a user's preference, the user's address, the user's initially set language, the user's contact list, etc. According to an embodiment, the AI agent 74 may additionally define the user's intent by complementing information included in the user's speech input using the user's specific information. For example, in response to the user's request "Invite my friends to my birthday party", the AI agent 74 does not request more clarified information from the user and may utilize the local knowledge 92 to determine who "the friends" are and when and where the "birthday" takes place.

The AI agent 74 may further include the dialogue management 93. The AI agent 74 may provide a dialogue interface to enable speech conversation with the user. The dialogue interface may refer to a procedure of outputting a response to the user's speech input through a display or a speaker. Here, a final result output through the dialogue interface may be based on the ASR operation, the NLU operation, and the TTS operation, which are described above.

Figure 12:
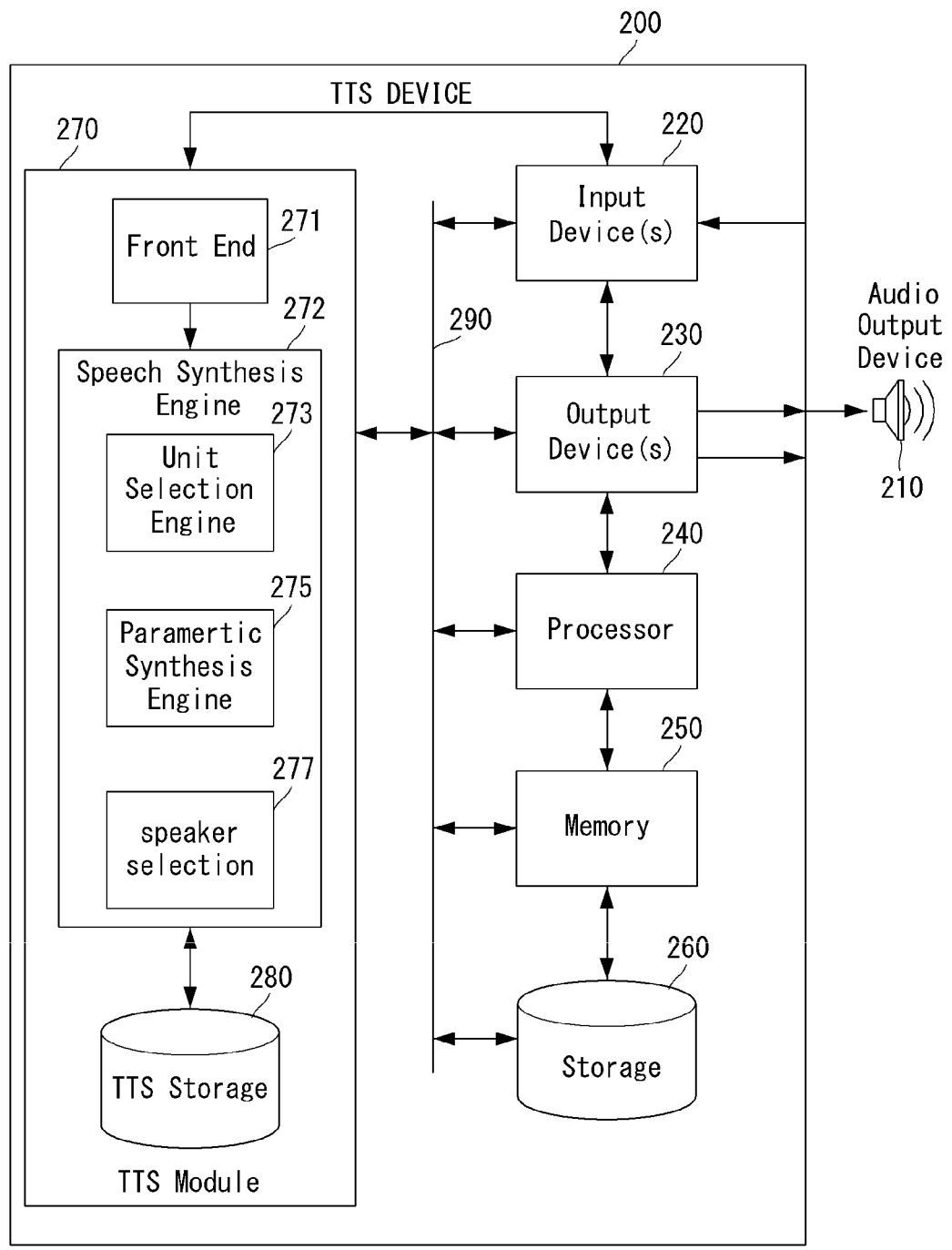
FIG. 12 is a block diagram illustrating an example TTS device according to an embodiment of the disclosure.

FIG. 12 is a block diagram illustrating an example speech synthesizing device according to an embodiment of the disclosure.

A TTS device 200 shown in FIG. 12 may include an audio output device 210 for outputting a speech processed by the TTS device 200 or by a different device.

FIG. 12 discloses the TTS device 200 for performing speech synthesis. An embodiment of the present disclosure may include computer-readable and computer-executable instructions that can be included in the TTS device 200. Although FIG. 12 discloses a plurality of elements included in the TTS device 200, configurations not disclosed herein may be included in the TTS device 200.

Meanwhile, some configurations disclosed in the TTS device 200 may be single configurations and each of them may be used multiple times in one device. For example, the TTS device 200 may include a plurality of input devices 220, an output device 230 or a plurality of controllers/processors 240.

A plurality of TTS devices may be applied to one TTS device. In such a multiple device system, the TTS device may include different configurations to perform various aspects of speech synthesis. The TTS device shown in FIG. 12 is merely an exemplary, may be an independent device, and may be implemented as one configuration of a large-sized device or system.

According to an embodiment of the present disclosure, a plurality of difference devices and a computer system may be, for example, applied to a universal computing system, a server-client computing system, a telephone computing system, a laptop computer, a mobile terminal, a PDA, and a tablet computer, etc. The TTS device 200 may be applied as a different device providing a speech recognition function, such as ATMs, kiosks, a Global Positioning System (GPS), a home appliance (e.g., a refrigerator, an oven, a washing machine, etc.), vehicles, ebook readers, etc. or may be applied as a configuration of the system.

Referring to FIG. 12, the TTS device 200 may include a speech output device 210 for outputting a speech processed by the TTS device 200 or by a different device. The speech output device 210 may include a speaker, a headphone, or a different appropriate configuration for transmitting a speech. The speech output device 210 may be integrated into the TTS device 200 or may be separated from the TTS device 200.

The TTS device 200 may include an address/data bus 290 for transmitting data to configurations of the TTS device 200. The respective configurations in the TTS device 200 may be directly connected to different configurations through the bus 290. Meanwhile, the respective configurations in the TTS device 200 may be directly connected to a TTS module 270.

The TTS device 200 may include a controller (processor) 240. A processor 240 may correspond to a CPU for processing data and a memory for storing computer-readable instructions to process data and storing the data and the instructions. The memory 250 may include a volatile RAM, a non-volatile ROM, or a different-type memory.

The TTS device 200 may include a storage 260 for storing data and instructions. The storage 260 may include a magnetic storage, an optical storage, a solid-state storage, etc.

The TTS device 200 may access a detachable or external memory (e.g., a separate memory card, a memory key drive, a network storage, etc.) through an input device 220 or an output device 230.

Computer instructions to be processed by the processor 240 to operate the TTS device 200 and various configurations may be executed by the processor 240 and may be stored in the memory 250, the storage 260, an external device, or a memory or storage included in the TTS module 270 described in the following. Alternatively, all or some of executable instructions may be added to software and thus embedded in hardware or firmware. An embodiment of the present disclosure may be, for example, implemented as any of various combinations of software, firmware and/or hardware.

The TTs device 200 includes the input device 220 and the output device 230. For example, the input device a microphone, a touch input device, a keyboard, a mouse, a stylus, or the audio output device 200 such as a different input device. The output device 230 may include a visual display or tactile display, an audio speaker, a headphone, a printer, or any other output device. The input device 220 and/or the output device 230 may include an interface for connection with an external peripheral device, such as a Universal Serial Bus (USB), FireWire, Thunderbolt, or a different access protocol. The input device 220 and/or the output device 230 may include a network access such as an Ethernet port, a modem, etc. The input device 220 and/or the output device may include a wireless communication device such as radio frequency (RF), infrared rays, Bluetooth, wireless local area network (WLAN) (e.g., WiFi and the like) or may include a wireless network device such as a 5G network, a long term evolution (LTE) network, a WiMAN network, and a 3G network. The TTS device 200 may include the Internet or a distributed computing environment through the input device 220 and/or the output device 230.

The TTS device 200 may include the TTS module 270 for processing textual data into audio waveforms including speeches.

The TTS module 270 may access to the bus 290, the input device 220, the output device 230, the audio output device 210, the processor 240, and/or a different configuration of the TTS device 200.

The textual data may be generated by an internal configuration of the TTS device 200. In addition, the textual data may be received from an input device such as a keyboard or may be transmitted to the TTS device 200 through a network access. A text may be a type of a sentence including a text, a number and/or a punctuation to convert into a speech by the TTS module 270. An input text may include a special annotation for processing by the TTS module 270 and may use the special annotation to indicate how a specific text is to be pronounced. The textual data may be processed in real time or may be stored or processed later on.

The TTS module 270 may include a front end 271, a speech synthesis engine 272, and a TTS storage 280. The front end 271 may convert input textual data into symbolic linguistic representation for processing by the speech synthesis engine 272. The speech synthesis engine 272 may convert input text into a speech by comparing annotated phonetic unit models and information stored in the TTS storage 280. The front end 271 and the speech synthesis engine 272 may include an embedded internal processor or memory, or may use a processor 240 included in the TTS device 200 or a memory. Instructions for operating the front end 271 and the speech synthesis engine 272 may be included in the TTS module 270, the memory 250 of the TTS device 200, the storage 260, or an external device.

Input of a text into the TTS module 270 may be transmitted to the front end 271 for a processing. The front end 271 may include a module for performing text normalization, linguistic analysis, and linguistic prosody generation.

While performing the text normalization, the front end 271 may process a text input and generate a standard text to thereby convert numbers, abbreviations, and symbols identically.

While performing the linguistic analysis, the front end 271 may generate language of a normalized text to generate a series of phonetic units corresponding to an input text. This process may be referred to as phonetic transcription. The phonetic units include symbol representation of sound units that are lastly coupled and output by the TTS device 200 as a speech. Various sound units may be used to divide a text for speech synthesis. The TTS module 270 may process a speech based on phonemes (individual acoustics), half-phonemes, di-phones (the last half of a phoneme coupled to a half of a neighboring phoneme), bi-phones (two continuous phones), syllables, words, phrases, sentences, or other units. Each word may be mapped to one or more phonetic units. Such mapping may be performed using a language dictionary stored in the TTS device 200.

Linguistic analysis performed by the front end 271 may include a process of identifying different syntactic elements, such as prefixes, suffixes, phrases, punctuations, and syntactic boundaries. Such syntactic elements may be used to output a natural audio waveform by the TTS module 270. The language dictionary may include letter-to-sound rules and other tools for pronouncing a previously unidentified word or letter combination that can be made by the TTS module 270. In general, the more the information is included in the language dictionary, the higher the quality of speech output can be ensured.

Based on the linguistic analysis, the front end 271 may generate linguistic prosody of which annotation is processed to prosodic characteristics so that phonetic units represent how final acoustic units has to be pronounced in a final output speech.

The prosodic characteristics may be referred to as acoustic features. While an operation of this step is performed, the front end 271 may integrate the acoustic features into the TTS module 270 in consideration of random prosodic annotations that accompanies a text input. Such acoustic features may include pitch, energy, duration, etc. Application of the acoustic features may be based on prosodic models that can be used by the TTS module 270. Such prosodic models represent how phonetic units are to be pronounced in a specific situation. For example, the prosodic models may take into consideration of a phoneme's position in a syllable, a syllable's position in a word, a word's position in a sentence or phrase, neighboring phonetic units, etc. Likewise to the language dictionary, the more information on prosodic models exists, the higher the quality of speech output is ensured.

An output from the front end 271 may include a series of phonetic units which are annotation-processed into prosodic characteristics. The output from the front end 271 may be referred to as symbolic linguistic representation. The symbolic linguistic representation may be transmitted to the speech synthesis engine 272. The speech synthetic engine 272 may convert the speech into an audio wave so as to output the speech to a user through the audio output device 210. The speech synthesis engine 272 is configured to convert an input test into a high-quality natural speech in an efficient way. Such a high-quality speech may be configured to be pronounced in a similar way of a human speaker as much as possible.

The speech synthesis engine 272 may perform synthesis using at least one or more other methods.

The unit selection engine 273 compares a recorded speech database with a symbolic linguistic representation generated by the front end 271. The unit selection engine 273 matches the symbol linguistic representation and a speech audio unit in the recorded speech database. In order to form a speech output, matching units may be selected and the selected matching units may be connected to each other. Each unit includes audio waveforms, which correspond to a phonetic unit such as a short WAV file of specific sound along with description of various acoustic features associated with the WAV file (pitch, energy, etc.), and also includes other information such as a position at which the phonetic unit is represented in a word, a sentence, a phrase, or a neighboring phonetic unit.

The unit selection engine 273 may match an input text using all information in a unit database in order to generate a natural waveform. The unit database may include examples of multiple speech units that provide different options to the TTS device 200 to connect the units to a speech. One of advantages of unit selection is that a natural speech output can be generated depending on a size of the database. In addition, the greater the unit database, the more natural the speech can be constructed by the TTS device 200.

Meanwhile, speech synthesis can be performed not just by the above-described unit selection synthesis, but also by parameter synthesis. In the parameter synthesis, synthesis parameters such as frequency, volume, and noise can be varied by a parameter synthesis engine 275, a digital signal processor, or a different audio generating device in order to generate artificial speech waveforms.

The parameter synthesis may match symbolic linguistic representation with a desired output speech parameter by using an acoustic model and various statistical techniques. In the parameter synthesis, a speech can be processed even without a large-capacity database related to unit selection and a processing can be performed at a high speed. The unit selection synthesis technique and the parameter synthesis technique may be performed individually or in combination to thereby generate a speech audio output.

The parameter speech synthesis may be performed as follows. The TTS module 270 may include an acoustic model that can transform symbolic linguistic representation into a synthetic acoustic waveform of a test input based on audio signal manipulation. The acoustic model may include rules that can be used by the parameter synthesis engine 275 to allocate specific audio waveform parameters to input phonetic units and/or prosodic annotations. The rules may be used to calculate a score indicating a probability that a specific audio output parameter (frequency, volume, etc.) may correspond to input symbolic linguistic representation from the pre-processor 271.

The parameter synthesis engine 275 may apply multiple techniques to match a speech to be synthesized with an input speech unit and/or a prosodic annotation. One of general techniques employs Hidden Markov Model (HMM). The HMM may be used to determine a probability for an audio output to match a text input. In order to artificially synthesize a desired speech, the HMM may be used to convert linguistic and acoustic space parameters into parameters to be used by a vocoder (digital voice encoder).

The TTS device 200 may include a speech unit database to be used for unit selection.

The speech unit database may be stored in the TTS storage 280, the storage 260, or another storage configuration. The speech unit database may include a recorded speech voice. The speech voice may be a text corresponding to utterance contents. In addition, the speech unit database may include a recorded speech (in the form of an audio waveform, a feature factor, or another format) occupying a considerable storage space in the TTS device 200. Unit samples in the speech unit database may be classified in various ways including a phonetic unit (a phoneme, a diphone, a word, and the like), a linguistic prosody label, an acoustic feature sequence, a speaker identity, and the like.

When matching symbolic linguistic representation, the speech synthesis engine 272 may select a unit in the speech unit database that most closely matches an input text (including both a phonetic unit and a prosodic symbol annotation). In general, the large the capacity of the speech unit database, the more the selectable unit samples and thus the more accurate the speech output.

Audio waveforms including a speech output to a user may be transmitted to the audio output device 210 from the TTS module 270 so that the audio waveforms are output to a user.

Audio waveforms including a speech may be stored in multiple different formats such as feature vectors, non-compressed audio data, or compressed audio data. For example, an audio output may be encoded and/or compressed by an encoder/decoder before the transmission. The encoder/decoder may encode or decode audio data such as digitalized audio data, feature vectors, etc. In addition, the function of the encoder/decoder may be included in an additional component or may be performed by the processor 240 and the TTS module 270.

Meanwhile, the TTS storage 280 may store different types of information for speech recognition.

Contents in the TTS storage 280 may be prepared for general TTS usage and may be customized to include sound and words that can be used in a specific application. For example, for TTS processing by a GPS device, the TTS storage 280 may include a customized speech specialized in position and navigation.

In addition, the TTS storage 280 may be customized to a user based on a personalized desired speech output. For example, the user may prefer an output voice of a specific gender, a specific accent, a specific speed, a specific emotion (e.g., a happy voice). The speech synthesis engine 272 may include a specialized database or model to explain such user preference.

The TTs device 200 may perform TTS processing in multiple languages. For each language, the TTS module 270 may include data, instructions, and/or components specially configured to synthesize a speech in a desired language.

For performance improvement, the TTS module 270 may modify or update contents of the TTS storage 280 based on a feedback on a TTS processing result, and thus, the TTS module 270 may improve speech recognition beyond a capability provided by a training corpus.

The TTS system may integrate the various components and other components above-mentioned. For example, the TTS device 200 may contain blocks for speaker selection.

The speaker selection module 277 may be provided for each character in the script. The speaker selection module 277 may be incorporated into the TTS module 270 or as part of the pre-processor 271 or speech synthesis engine 272. The speaker selection module 277 using metadata corresponding to the speaker profile so that text corresponding to multiple attributes may be synthesized into the voice of the set speaker.

According to an embodiment of the present disclosure, the metadata may be in markup language and preferably in speech synthesis markup language (SSML).

—Speaker Verification—

Figure 13:
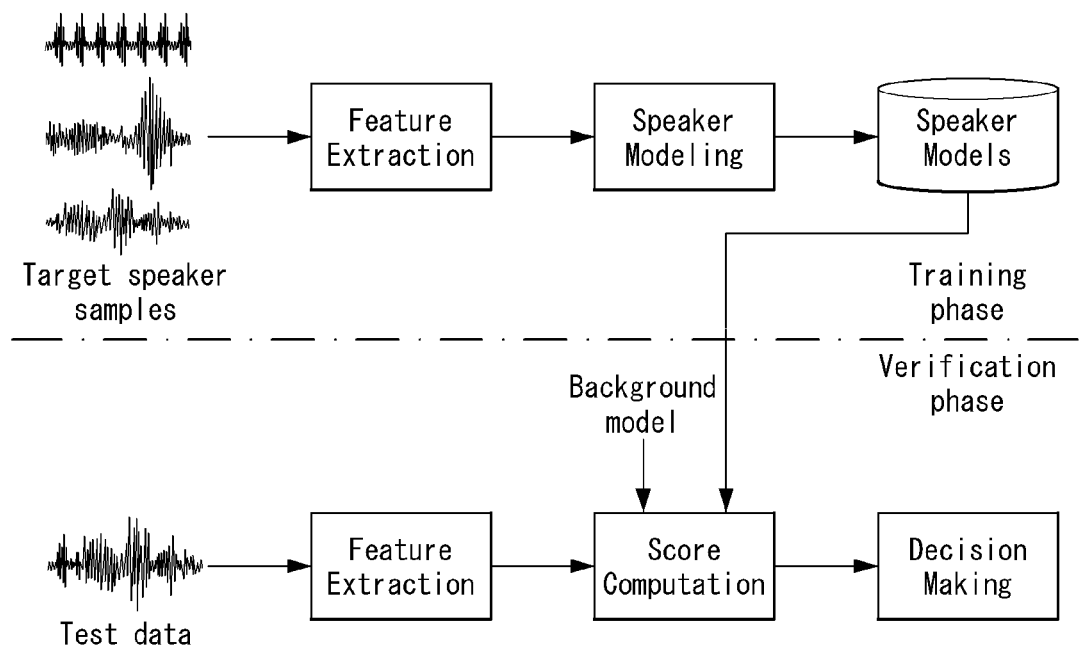
FIG. 13 is a flowchart illustrating a method of gathering learning samples according to an embodiment of the disclosure.

FIG. 13 is a view illustrating a speaker verification model.

Speaker recognition for finding a person's speech may be divided into speaker identification and speaker verification. Speaker identification is a method for identifying a speaker with the most similar speech characteristics among a plurality of pre-registered speakers using speech characteristics input to a system. In contrast, speaker verification is a method of verifying whether a new speech entered corresponds to a registered speaker's speech using a learning model only for a specific speaker. As such, speaker identification and speaker verification differ in implementation.

Methods of implementing speaker verification may be divided into text-dependent and text-independent methods. Text-dependent methods perform speaker verification only with determined words by using a specific word and sentence as a kind of identifier. Text-independent methods carry out speaker verification using any entered word, rather than using predetermined words or sentences.

Referring to FIG. 13, according to an embodiment of the disclosure, a speaker verification method may include a verification model training phase and a verification phase using the generated verification model. In this case, 'verification model' may be interchangeably used with 'speaker model,' and 'universal background model' may be interchangeably used with 'background model.'

In the training phase, the speaker verification model may be trained using speech data samples of a speaker to be registered. At this time, the voice data samples may include a plurality of pieces of speech data for a predetermined sentence (e.g., "HI, LG"). A speaker verifier may analyze utterance characteristics included in the predetermined sentence and train the speaker verification model using the utterance characteristics.

The so-trained speaker verification model may be stored in at least one or more of a server or a mobile terminal.

In the verification phase, the server or mobile terminal may apply any received speech data to the trained speaker verification model and identify whether the entered and/or received speech data is speech data of a pre-registered speaker. According to an embodiment, the verification phase may further include a background model. The background model is a model that may be used in detecting background noise. The background noise may be accepted or rejected as normal noise depending on a Gaussian mixture model (GMM) for normal noise and universal background model and Gaussian mixture model (UBM-GMM) likelihood ratio.

The speaker verification system may typically use mel-frequency cepstral coefficients (MFCCs) or linear prediction cepstral coefficients (LPCCs) for speech data feature extraction, but is not limited thereto. As verification models in speaker verification, gaussian mixture models (GMMs), adaptive GMMs (AGMMs), or modified adaptive GMMs (MAGMMs) may be used, but not limited thereto. The above-described feature extraction and verification models are known in the art and, thus, no detailed description thereof is given herein.

Various embodiments of the disclosure may include at least one process shown in FIGS. 14 to 19 and should not be interpreted as including all of the shown processes. Further, various embodiments of the disclosure should not be interpreted as limited by the order shown in FIGS. 14 to 19, and several processes thereof may be performed in a different order.

Described below are flowcharts or sequence diagrams according to various embodiments of the disclosure.

Figure 14:
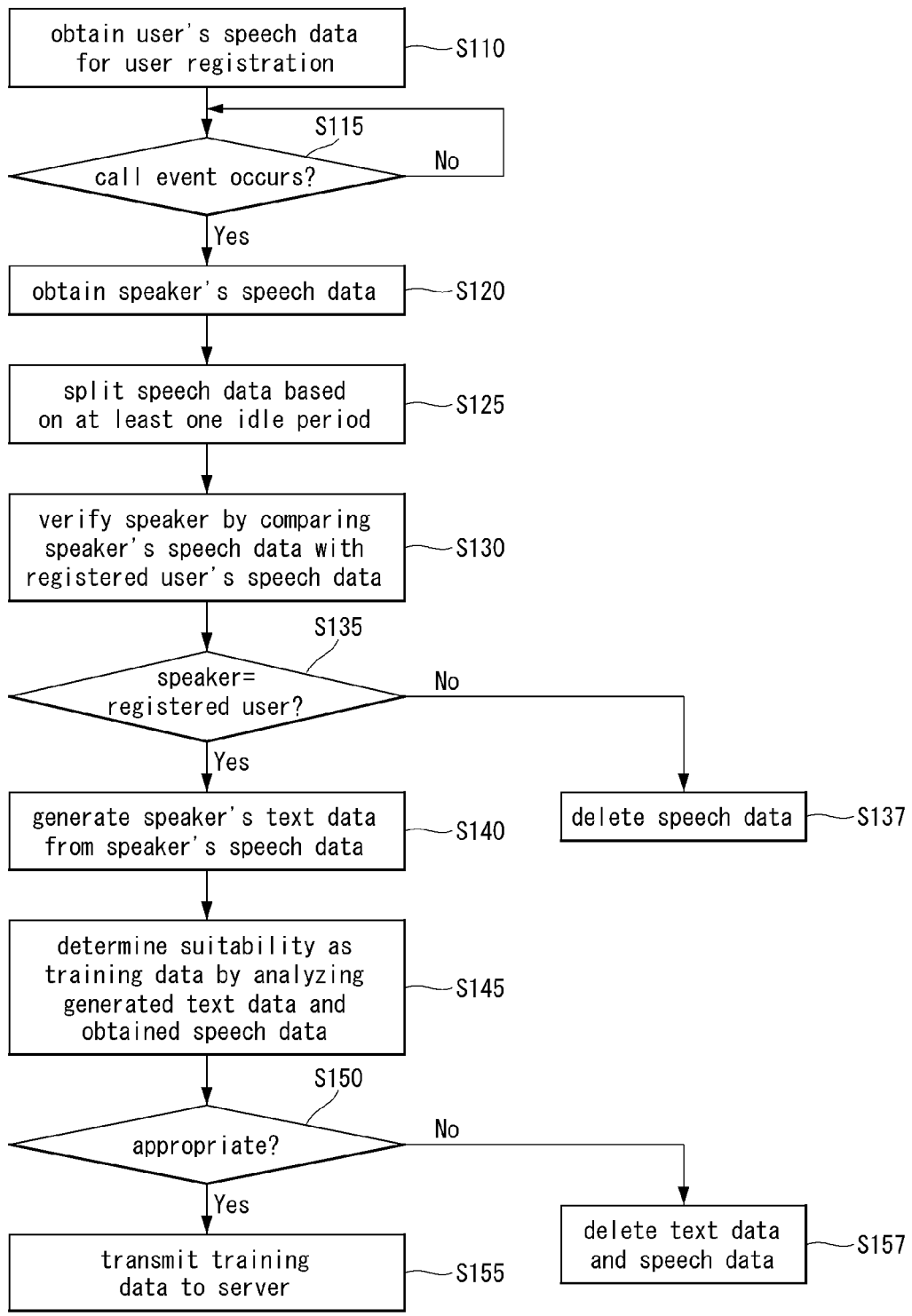
FIG. 14 is a flowchart illustrating a first example of S145 of FIG. 13.

FIG. 14 is a flowchart illustrating a method of gathering learning samples according to an embodiment of the disclosure.

At least one process shown in FIG. 14 may be performed by a mobile terminal, a server, or a system including the mobile terminal and the server. As an example, operations performed by a processor 240 of the mobile terminal are described. Operations performed by a network are described below with reference to FIG. 19.

Referring to FIG. 14, the processor 240 may obtain a user's speech data for registering the user (S110).

At this time, the processor 240 may obtain the user's speech data for user registration via a microphone and register the user using the obtained speech data. The processor 240 may store the user's speech characteristics including speech tone, intonation, and base frequency and tag the stored speech characteristics with a user indicator or user ID for use later in the speaker verification phase.

At this time, the processor 240 may receive consent for gathering the user's speech data and, only when receiving the consent, the processor 240 may obtain and/or store the user's speech data for user registration.

If a call event (Yes in S115) occurs, the processor 240 may obtain the speaker's speech data (S120).

At this time, 'speaker' denotes the person entering speech signals to the mobile terminal while the call event occurs, and 'user' denotes at least one person registered as users in the mobile terminal or the owner of the mobile terminal.

As an example, the mobile terminal may obtain and store, in real-time, the speaker's speech data while the call event lasts. As an example, the mobile terminal may store the speaker's speech data a specific time after the call event terminates. As an example, the mobile terminal may obtain and store, in real-time, the speaker's speech data while the call event lasts and may transmit the speech data to the server.

At this time, the processor 240 may perform, e.g., noise cancellation, on speech data entered from the microphone, thereby purifying the speech data.

The processor 240 may split the speech data based on at least one idle period (S125).

The processor 240 may split the obtained speech data per sentence or into pieces of data with a proper length to be used as training data. As an example, an idle period may occur when the speaker waits for the other party's reply while talking. The processor 240 may split the speech data based on the idle period. As an example, an idle period may occur when the speaker pauses between after speaking one sentence and before starting another. The processor 240 may split the speech data based on the idle period.

The processor 240 may perform speaker verification by comparing the speaker's speech data with the registered user's speech data (S130).

In some cases, while a person, not a pre-registered user, talks on the mobile terminal or a pre-registered user talks, the mobile terminal may receive other persons' speeches via the microphone. At this time, since data which is not of registered users is data unnecessary for generating or training the learning model, the data needs to be deleted out or excluded.

At this time, the processor 240 may address the foregoing issues by speaker verification that may adopt a legacy speaker verifier. The speaker verification process of the disclosure may be performed by a known speaker verification method apparent to one of ordinary skill in the field of speech processing. As an example, the processor 240 may compare the registered user's speech data and the speaker's speech data obtained, thereby determining whether the speaker is an registered user.

As an example, the processor 240 may apply the speaker's speech data obtained to a pretrained speaker verification model and classify the speaker as an registered user or non-registered user based on the value output from the speaker verification model. The speaker verification model may be an artificial neural network-based learning model.

Upon determining that the speech data is from the registered user as a result of the speaker verification, the processor 240 may generate the speaker's text data from the speaker's speech data (Yes in S135 and S140).

The processor 240 may generate text data corresponding to the obtained speech data using an ASR module. The ASR module may include a legacy speech recognizer.

Upon determining that the speech data is not from the registered user as a result of the speaker verification, the processor 240 may delete out the speaker's speech data obtained (No in S135 and S137).

The processor 240 may analyze the generated text data and obtained speech data, thereby determining that it is suitable as training data (S145).

As an example, the processor 240 may determine the suitability of the speaker's speech data based on the signal-to-noise ratio of the speech data. As an example, the processor 240 may determine the suitability of the text data depending on the number of non-registered words detected by comparing the text data with a language dictionary. As an example, the processor 240 may determine the suitability of the text data by detecting non-linguistic segments included in the text data. Since the speech data and the text data configure, in one set, the training data, if one of the speech data or text data is determined to be inappropriate, the other may also be deleted out. A detailed description of data suitability is described below with reference to FIGS. 15 to 17.

Upon determining that the generated text data and the obtained speech data are suitable for use as training data, the processor 240 may transmit the training data to the server via the communication module (Yes in S150 and S155).

The processor 240 may transmit the training data to the server based on various update time-related settings. As an example, the processor 240 may transmit the training data to the server if a preset update time arrives. As an example, the processor 240 may delete or modify the training data in response to the user for the obtained training data and transmit the modified training data to the server. This is described below in detail with reference to FIGS. 23 and 24.

Upon determining that the generated text data and the obtained speech data are inappropriate for use as training data, the processor 240 may delete out the speaker's text data and speech data (No in S150 and S157).

Figure 15:
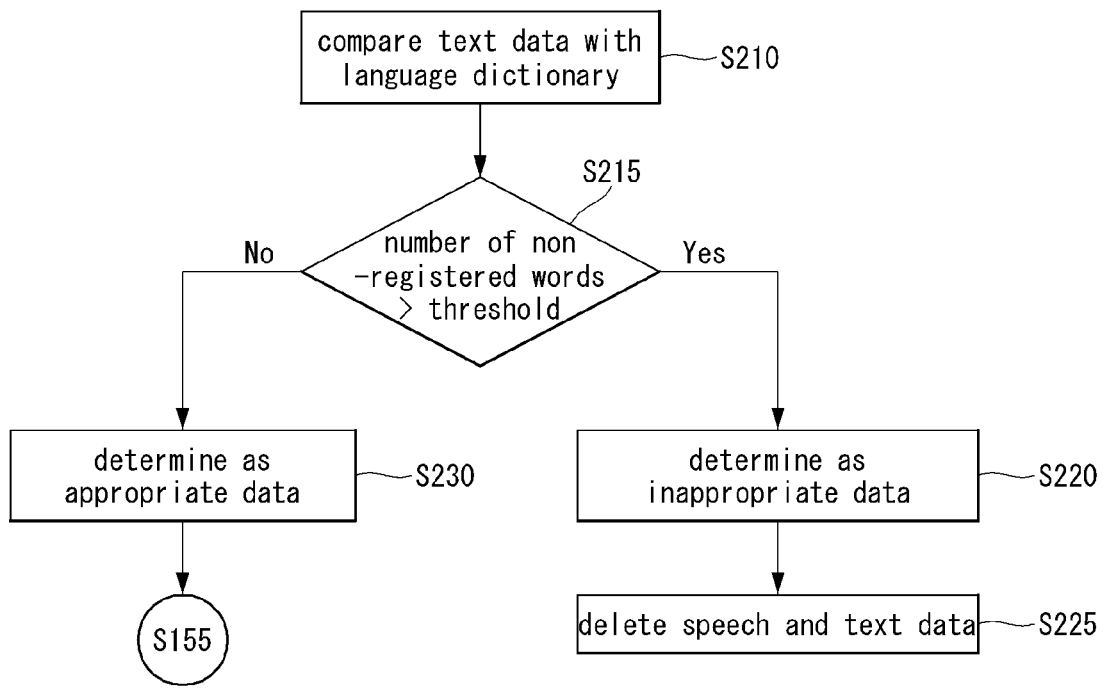
FIG. 15 is a flowchart illustrating a second example of S145 of FIG. 13.

FIG. 15 is a flowchart illustrating a first example of S145 of FIG. 14.

Referring to FIG. 15, the processor 240 may compare the speaker's text data obtained with the language dictionary (S210).

If the number of non-registered words included in the speaker's text data exceeds a preset threshold based on a result of the comparison, the processor 240 may determine that the speaker's speech data and text data are inappropriate data (Yes in S210 and S220).

The processor 240 may delete the speaker's speech data and text data determined to be inappropriate from the memory (S225).

At this time, the processor 240 may delete the portion corresponding to the non-registered words included in the speaker's text data or the whole text data.

If the number of non-registered words included in the speaker's text data is not more than the preset threshold based on a result of the comparison, the processor 240 may determine that the speaker's speech data and text data are appropriate data (No in S215 and S230).

Figure 16:
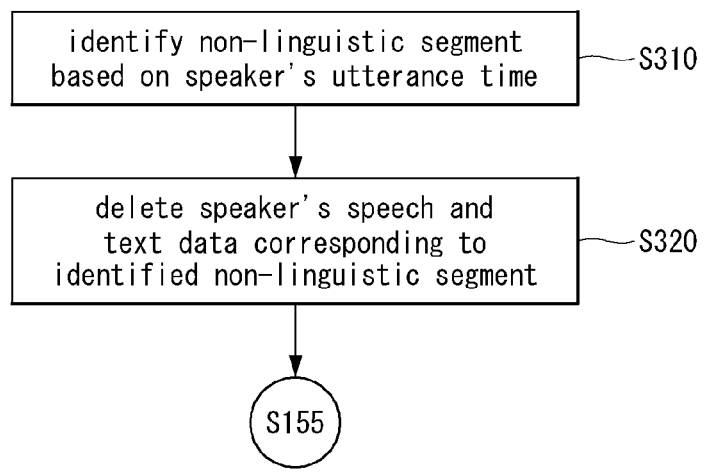
FIG. 16 is a flowchart illustrating a third example of S145 of FIG. 13.

FIG. 16 is a flowchart illustrating a second example of S145 of FIG. 14.

Referring to FIG. 16, the processor 240 may identify anon-linguistic segment based on the speaker's utterance time (S310). The non-linguistic segment means a segment including non-linguistic information. The non-linguistic information may include at least one of pause fillers, interference, or lengthening.

A pause filler means, e.g., a meaningless filler word that marks a pause or hesitation in speech. Examples of pause fillers include, e.g., meaningless syllables or words, such as 'Uh,' 'Um,' etc.

Lengthening means the lengthening of a specific syllable or phoneme when the speaker issues an utterance. For example, this happens when the speaker lengthens the vowel 'uh,' 'eh', or 'ah' in the end of a word. Lengthening may occur not only at the end of a sentence but also in the middle, unlike tone in which pitch rises or falls at the end of the sentence interrogatory or declarative. Hence, lengthening may be determined by analyzing when the speaker's utterance has a silent syllable or switches to other speaker's utterance.

Interference means when speeches from a plurality of speakers overlap. For example, interference may arise when one speaker intervenes when another finishes his utterance. In other words, interference may be caused when a first speaker's utterance is stopped by a second speaker's utterance or the speeches of the first and second speakers overlap.

The processor 240 may delete the speaker's speech data and text data corresponding to the identified non-linguistic segment (S320).

The processor 240 may store the other appropriate text data and speech data than the speaker's speech data and text data corresponding to the identified non-linguistic segment in the memory.

Figure 17:
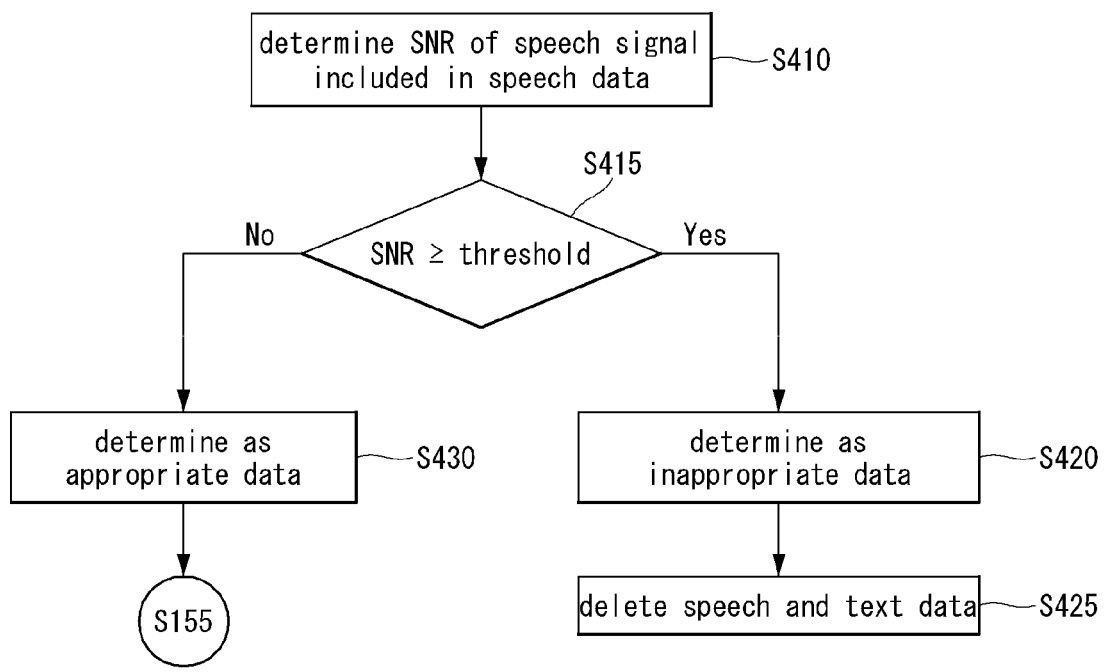
FIG. 17 is a sequence view illustrating a method of gathering speech samples and generating a speech synthesis model according to an embodiment of the disclosure.

FIG. 17 is a flowchart illustrating a third example of S145 of FIG. 14.

Referring to FIG. 17, the processor 240 may compute the signal-to-noise ratio (SNR) by analyzing the speaker's speech data (S410).

If the SNR is less than a preset threshold, the processor 240 may determine that the speaker's speech data is inappropriate data (Yes in S415 and S420).

The processor 240 may delete out at least one piece of speech data or text data corresponding to the speech data, which have been determined to be inappropriate data. As an example, if there exists speech data determined to include inappropriate data from the analysis of SNR, the speech data including the inappropriate data or the text data corresponding to the speech data may be deleted out. As an example, if the inappropriate data is detected, the processor may delete the portion of speech data corresponding to the detected inappropriate data or its corresponding text data.

Figure 18:
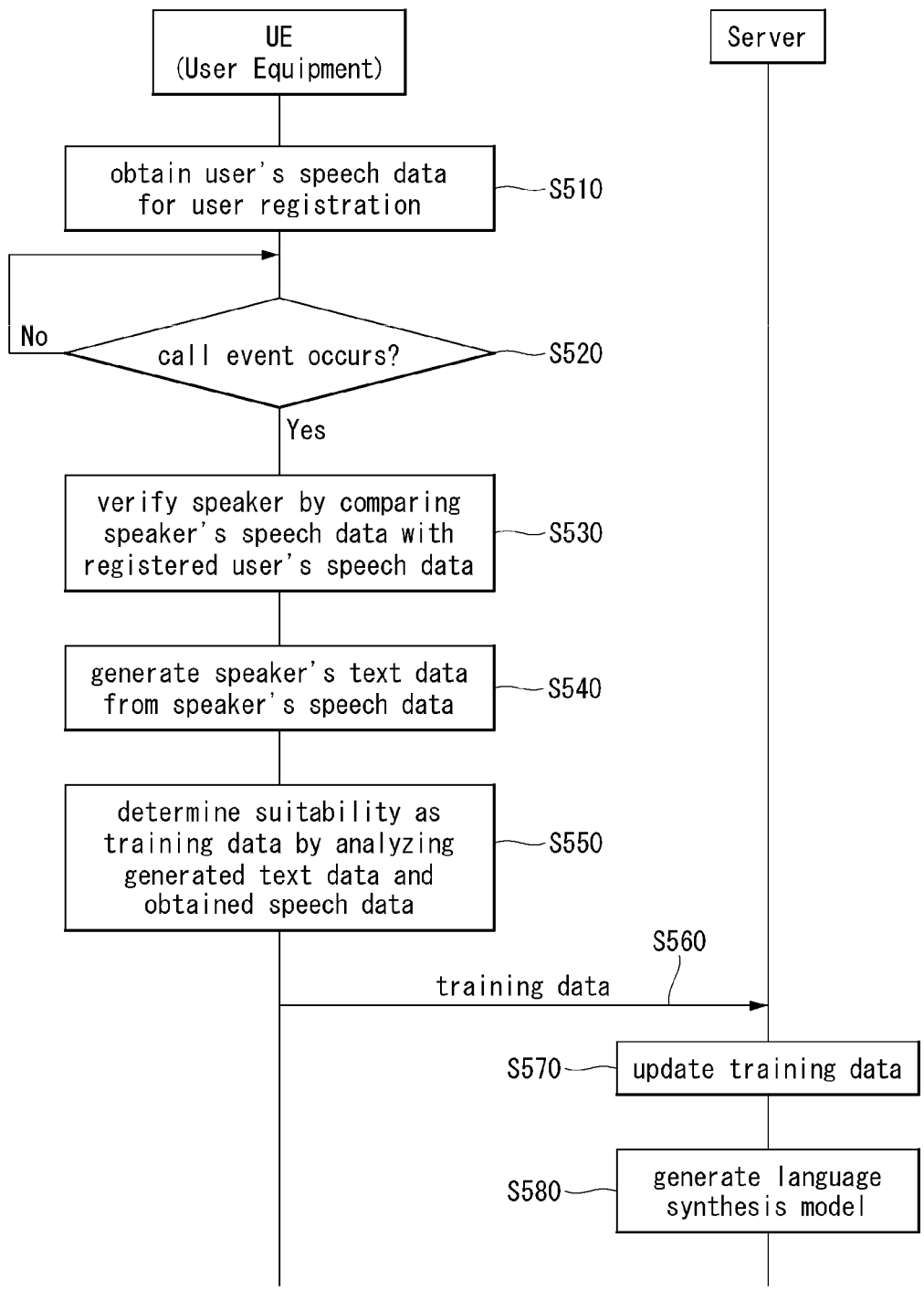
FIG. 18 is a sequence view illustrating a method of gathering speech samples and generating a speech synthesis model according to another embodiment of the disclosure.

FIG. 18 is a sequence view illustrating a method of gathering speech samples and generating a speech synthesis model according to an embodiment of the disclosure. No duplicate description is presented below of those described above in connection with FIGS. 15 to 17. In FIG. 18, UE may denote a mobile terminal, and Server may include a server or a 5G network.

Referring to FIG. 18, the mobile terminal may obtain a user's speech data for user registration via a microphone (S510).

If a call event occurs, the mobile terminal may compare the speaker's speech data with an registered user's speech data, thereby performing speaker verification (Yes in S520 and S530).

The mobile terminal may generate the speaker's text data from the speaker's speech data (S540).

The mobile terminal may analyze the generated text data and obtained speech data, thereby determining the suitability as training data (S550).

The mobile terminal may transmit the speaker's text data and speech data determined to be appropriate for use as training data to the server (S560).

At this time, the mobile terminal may transmit user information together. The user information may include identification information or utterance characteristics of a specific user. According to an embodiment of the disclosure, the server may assign a label to the training data using the received user information. As a result, the training data may be labeled with the speaker's user information and, then, a target utterance style may be implemented more effectively during a TTS process using a speech synthesis model.

Further, according to an embodiment of the disclosure, the mobile terminal may transmit a message for requesting to update the training data, along with the training data. The message for requesting to update the training data may be transmitted to the server by various methods and/or periods. The various methods and/or periods may be determined depending on the mobile terminal's configuration information.

The server may update the training data using the training data received from the mobile terminal (S570).

The server may generate or train a language synthesis model using the updated training data (S580).

The so-generated language synthesis model may be one synthesized based on the user's speech and be used to generate a synthesized speech reflecting the user's utterance style.

Figure 19:
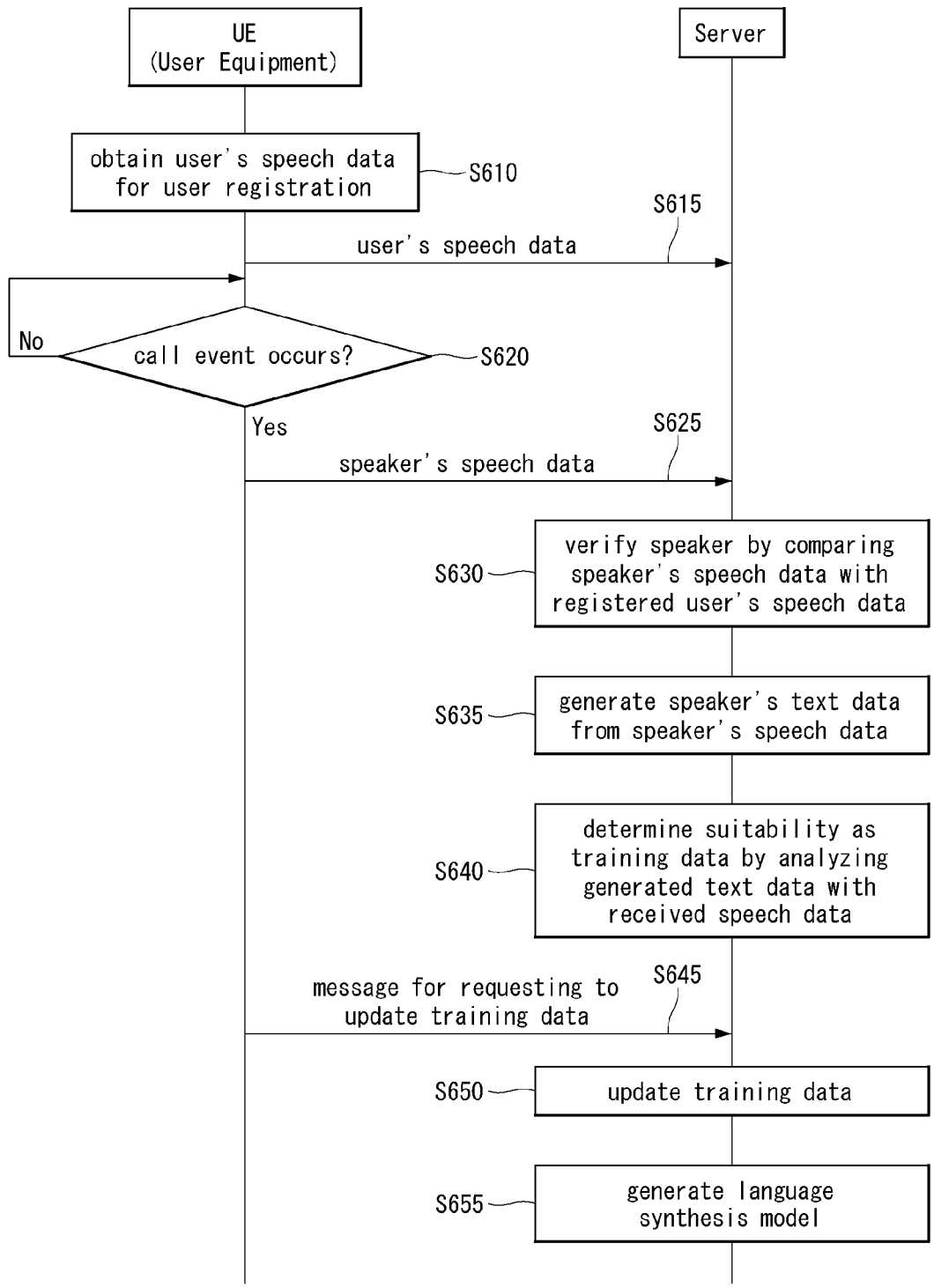
FIG. 19 illustrates a mobile terminal transmitting learning data while talking.

FIG. 19 is a sequence view illustrating a method of gathering speech samples and generating a speech synthesis model according to another embodiment of the disclosure. In FIG. 19, UE may denote a mobile terminal, and Server may include a server or a 5G network. Referring to FIG. 19, the mobile terminal may obtain a user's speech data for user registration via a microphone (S510).

The mobile terminal may transmit the user's speech data for user registration to the server (S615).

At this time, the server may perform user registration based on the user's speech data received.

When a call event occurs, the mobile terminal may transmit the speaker's speech data obtained to the server (Yes in S620 and S625).

At this time, the mobile terminal may transmit user information together. The user information may include identification information or utterance characteristics of a specific user. According to an embodiment of the disclosure, the server may assign a label to the training data using the received user information. As a result, the training data may be labeled with the speaker's user information and, then, a target utterance style may be implemented more effectively during a TTS process using a speech synthesis model.

The server may compare the speaker's speech data received from the mobile terminal with a pre-registered user's speech data, thereby performing speaker verification (S630).

The server may generate the speaker's text data from the speaker's speech data (S635).

The server may analyze the generated text data and received speech data, thereby determining the suitability as training data (S640).

The mobile terminal may transmit a message for requesting to update the training data to the server (S645).

At this time, the message for requesting to update the training data may be transmitted to the server by various methods and/or periods. The various methods and/or periods may be determined depending on the mobile terminal's configuration information.

The server may update the training data using the training data received from the mobile terminal (S650).

The server may generate or train a language synthesis model using the updated training data (S655).

The so-generated language synthesis model may be one synthesized based on the user's speech and be used to generate a synthesized speech reflecting the user's utterance style.

Figure 20:
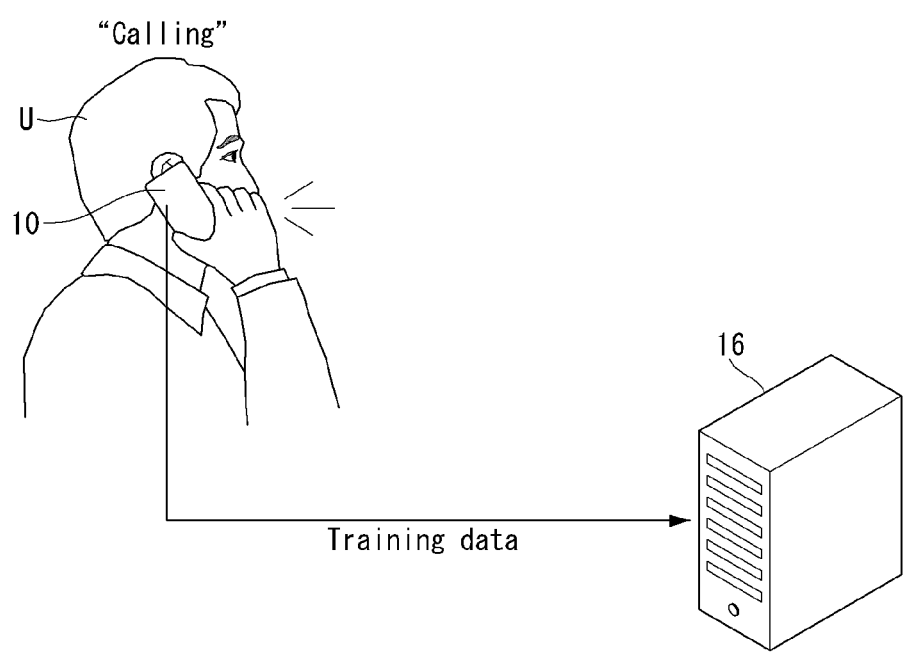
FIG. 20 illustrating a speaker verification model.

FIG. 20 illustrates a mobile terminal transmitting training data while talking.

Referring to FIG. 20, a mobile terminal 10 may transmit training data obtained while the user talks on the mobile terminal 10 to a server 16. As described above in connection with FIGS. 14 to 17, the mobile terminal 10 may perform various processes for selecting data necessary for learning.

The training data transmitted from the mobile terminal 10 to the server 16 may include speech data and/or text data. At this time, the transmitted training data may be data verified based on the user information among a plurality of pieces of speech data and text data obtained while the user talks on the mobile terminal 10. In other words, the method of gathering learning samples according to an embodiment of the disclosure may transmit, to the server 16, only data selected based on the user information and the call state of the mobile terminal 10. As a result, the server 16 may train the learning model that may perform more precise and accurate speech synthesis even with less training data.

At this time, the mobile terminal 10 and the server 16 may be connected via communication, specifically via a 5G network. As an example, the mobile terminal 10 may transmit a speaker (U)'s speech data or text data to the server 16 included in the 5G network. Further, the mobile terminal 10 may receive AI-processed information from the server 16 via the communication module.

Meanwhile, the mobile terminal 10 may perform an initial attach procedure with the 5G network to transmit the speaker (U)'s speech data and transmitted to the 5G network. The mobile terminal 10 may perform the initial access procedure with the 5G network based on a synchronization signal block (SSB).

Further, the mobile terminal 10 may receive, from the network, downlink control information (DCI) used to schedule transmission of the speaker (U)'s speech data or text data via the communication module.

The mobile terminal 10 may transmit the speaker (U)'s speech data or text data to the 5G network based on the DCI. The so-transmitted speech data or text data may be transmitted to the 5G network via a PUSCH, and the DM-RSs of the synchronization signal block (SSB) and PUSCH may be quasi co-located (QCL) for QCL type D.

As described above in connection with FIGS. 15 to 17, the mobile terminal 10 may determine whether the obtained speech data or text data is appropriate as training data. The speech data and text data may be configured in one set, and if any one of the speech data or text data is determined to be inappropriate as training data, the other may also be removed.

Figure 21:
FIG. 21 illustrating a process of determining the suitability of the speech data of FIG. 14.

FIG. 21 is a view illustrating a process of determining the suitability of the speech data of FIG. 15. The user may perform a call in various environments. As an example, the user may conduct a call in a noisy environment.

A method of determining the suitability of speech data may include various processes. As an example, the mobile terminal 10 may determine the suitability of speech data based on the signal-to-noise ratio. Specifically, the mobile terminal 10 may analyze the speech data and, if the signal-to-noise ratio of the speech signal is smaller than a specific threshold, determine that the speech data is inappropriate. The specific threshold may be, e.g., a preset value. As another example, the specific threshold may be a value determined based on the magnitude of noise received from the mobile terminal 10.

Figure 22:
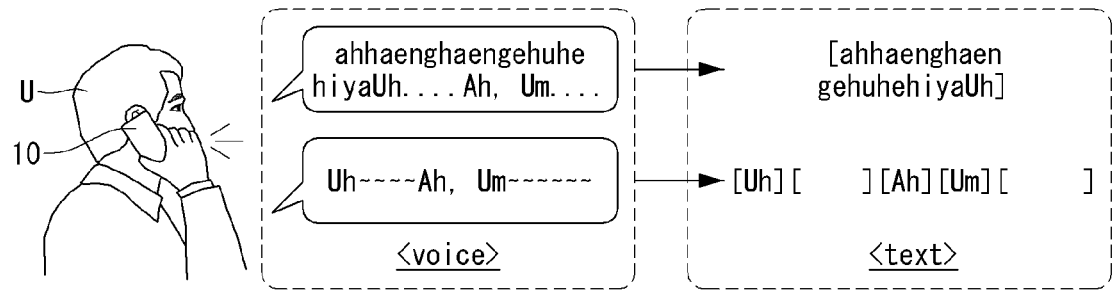
FIG. 22 illustrating a process of determining the suitability of the text data of FIGS. 15 and 16.

FIG. 22 is a view illustrating a process of determining the suitability of the text data of FIGS. 16 and 17.

Referring to FIG. 22, a method of determining the suitability of text data may include a first method of computing the number of non-registered words by comparison with a language dictionary and determining the suitability according to the computed number of non-registered words.

The method may further include a second method of determining a non-linguistic segment based on the speaker (U)'s utterance time. The non-linguistic segment denotes at least one segment including non-linguistic information. The non-linguistic information may include at least one of pause fillers, interference, or lengthening as described above.

Referring to FIG. 22, if the speaker (U) utters 'ahhaeng-haengehuhehiya' while speaking, and the mobile terminal 10 may recognize it as [ahhaenghaengehuhehiya]. At this time, the recognized text is not one registered in the language dictionary and is meaningless as training data. Thus, the mobile terminal 10 may delete the speech data and text data for 'ahhaenghaengehuhehiya.'

If the speaker (U) utters "Uh . . . Ah, Um . . . " while speaking, the mobile terminal 10 may recognize it as [Uh . . . ][Ah][Um . . . ]. At this time, since the recognized text contains a small number of pieces of text relative to the utterance time, it may be classified as pause fillers or lengthening. The so-classified pause fillers or lengthening is a non-linguistic element, and the speech data and text data corresponding thereto may be deleted from the memory.

The training data may be updated in various manners depending on the settings of the mobile terminal 10. As an example, the update of training data may be determined differently depending on configuration information regarding update periods or whether the user examines update data. A process of updating training data is described below with reference to FIGS. 23 and 24.

Figure 23:
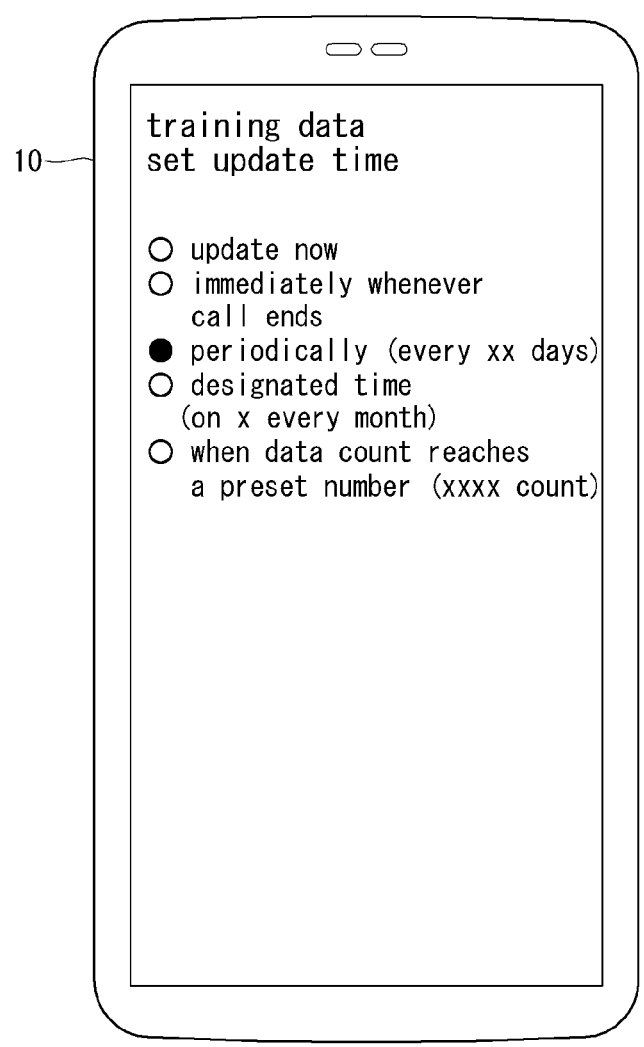
FIG. 23 illustrating a time of updating training data.

FIG. 23 is a view illustrating a time of updating training data.

Referring to FIG. 23, settings regarding update periods may include at least one of a first mode in which an immediate update is performed, a second mode in which an update is performed whenever call ends, a third mode in which an update is performed periodically, a fourth mode in which an update is performed at a designated time, or a fifth mode in which an update is performed when a designated number of pieces of data are met.

As an example, in the first mode, the mobile terminal 10 may immediately transmit the currently accumulated training data to the server 16. As an example, in the second mode, the mobile terminal 10 may immediately transmit the training data to the server 16 whenever a call ends. As an example, in the third mode, the mobile terminal 10 may transmit the training data to the server 16 every few years, months, or days, such as every 0.5 days, every day, every seven days, every 30 days, every two years, or every year. As an example, in the fourth mode, the mobile terminal 10 may transmit the training data to the server 16 at a designated time, such as at 11:00 Am, Dec. 31, 2019. As an example, in the fifth mode, the mobile terminal 10 may transmit the training data to the server 16 when the number of pieces of training data reaches a designated number (e.g., 1,000).

If the training data is transmitted randomly but not based on the configuration information related to updating the training data, learning samples may be hard to effectively gather depending on the mobile terminal's communication environment or battery status. As such, the server may more effectively obtain the user's speech samples by gathering the training data based on the settings regarding the user's update.

Figure 24:
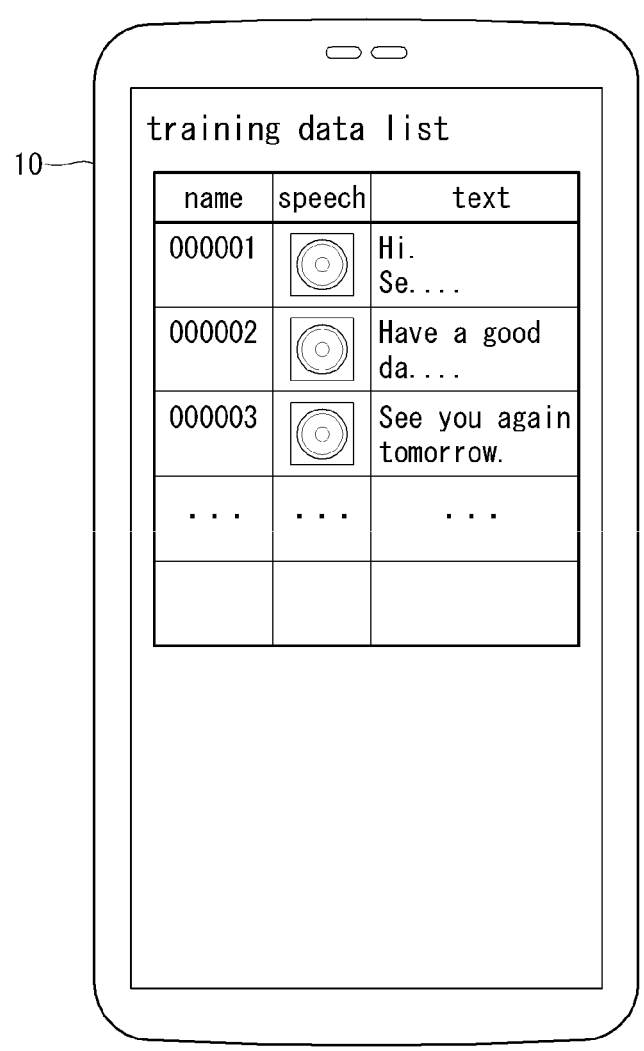
FIG. 24 illustrating an example method of examining gathered training data.

FIG. 24 is a view illustrating an example method of examining gathered training data.

Referring to FIG. 24, the mobile terminal 10 may be configured to, rather than automatically transmitting training data to the server 16, transmit the training data to the server 16 after examined by the user. At this time, the user's examination is not necessary for transmission of training data, and the data may be immediately transmitted to the server 16 without the user's examination depending on the mobile terminal (10)'s configuration information.

As an example, the mobile terminal 10 may delete speech data and text data before transmitting the data to the server 16 based on the user's input signal. As an example, the mobile terminal 10 may modify the text data based on the user's input signal.

According to an embodiment of the disclosure, the mobile terminal 10 may display a training data list on the display. The mobile terminal 10 may receive the user's touch input on the touchscreen and may delete or modify the speech data and/or text data in response to the received touch input. Further, the mobile terminal 10 may transmit the training data to the server 16 in response to the user's touch input.

According to various embodiments of the disclosure, all the speech samples gathered are personal information which may involve a security issue. Thus, the training data may undergo additional filtering regarding use of personal information via the user's additional examination process.

The above-described embodiments of the disclosure may be implemented in code that a computer may read out of a recording medium. The computer-readable recording medium includes all types of recording devices storing data readable by a computer system. Examples of the computer-readable recording medium include hard disk drives (HDDs), solid state disks (SSDs), silicon disk drives (SDDs), read-only memories (ROMs), random access memories (RAMs), CD-ROMs, magnetic tapes, floppy disks, or optical data storage devices, or carrier wave-type implementations (e.g., transmissions over the Internet). Thus, the above description should be interpreted not as limiting in all aspects but as exemplary. The scope of the disclosure should be determined by reasonable interpretations of the appended claims and all equivalents of the disclosure belong to the scope of the disclosure.

What is claimed is:

1. A method of gathering learning samples, the method comprising:
   obtaining, by a processor, a speaker's speech data via a microphone when a call event occurs;
   performing, by the processor, speaker verification by comparing the speaker's speech data obtained with a registered user's speech data;
   if the speaker is determined to be the registered user as a result of the speaker verification, storing, by the processor, the speaker's speech data obtained while the call event lasts;
   generating, by the processor, the speaker's text data from the speaker's speech data; and
   transmitting, by the processor, training data including the speaker's speech data and text data to a server,
   wherein the transmitting the training data to the server includes transmitting the training data at a preset update time, and wherein the preset update time is when a designated number of pieces of data are met.

2. The method of claim 1, wherein
the training data is data labeled with identification information about the registered user.

3. The method of claim 1, further comprising:
receiving, by the processor, a consent related to gathering the user's speech data; and
upon receiving the consent, obtaining, by the processor, the user's speech data for user registration.

4. The method of claim 1, further comprising:
unless the speaker is determined to be the registered user, deleting, by the processor, the speaker's speech data obtained while the call event lasts.

5. The method of claim 1, further comprising:
splitting, by the processor, the speaker's speech data obtained, based on at least one idle period.

6. The method of claim 1, further comprising:
determining, by the processor, a number of non-registered words in a language dictionary by comparing the speaker's text data with the language dictionary; and
deleting, by the processor, the speaker's speech data and text data if the number of non-registered words is not less than a preset threshold based on a result of the determination.

7. The method of claim 1, further comprising:
identifying, by the processor, a non-linguistic segment based on the speaker's utterance time; and
deleting, by the processor, the speaker's speech data and text data corresponding to the identified non-linguistic segment.

8. The method of claim 1, further comprising:
calculating, by the processor, a signal-to-noise ratio (SNR) by analyzing the speaker's speech data; and
deleting, by the processor, the speaker's speech data if the SNR is less than a preset threshold.

9. An intelligent device, comprising:
a memory;
a microphone obtaining a speaker's speech data when a call event occurs;
a processor performing speaker verification by comparing the speaker's speech data obtained with a registered user's speech data, if the speaker is determined to be the registered user as a result of the speaker verification, storing, in the memory, the speaker's speech data obtained while the call event lasts, and generating the speaker's text data from the speaker's speech data, and
a transceiver transmitting training data including the speaker's speech data and text data to a server at a preset update time,
wherein the preset update time is when a designated number of pieces of data are met.

10. The intelligent device of claim 9, wherein
the training data is data labeled with identification information about the registered user.

11. The intelligent device of claim 9, wherein
the processor obtains the user's speech data for user registration upon receiving a consent related to gathering the user's speech data.

12. The intelligent device of claim 9, wherein
the processor deletes the speaker's speech data obtained while the call event lasts unless the speaker is determined to be the registered user.

13. The intelligent device of claim 9, wherein
the processor splits the speaker's speech data obtained, based on at least one idle period.

14. The intelligent device of claim 9, wherein
the processor determines a number of non-registered words in a language dictionary by comparing the speaker's text data with the language dictionary and deletes the speaker's speech data and text data if the number of non-registered words is not less than a preset threshold based on a result of the determination.

15. The intelligent device of claim 9, wherein
the processor identifies a non-linguistic segment based on the speaker's utterance time and deletes the speaker's speech data and text data corresponding to the identified non-linguistic segment.

16. The intelligent device of claim 9, wherein
the processor calculates a signal-to-noise ratio (SNR) by analyzing the speaker's speech data and deletes the speaker's speech data if the SNR is less than a preset threshold.

* * * * *